(12) United States Patent
Hattori et al.

(10) Patent No.: US 10,958,132 B2
(45) Date of Patent: Mar. 23, 2021

(54) MOTOR AND ELECTRIC POWER STEERING DEVICE

(71) Applicant: Nidec Corporation, Kyoto (JP)

(72) Inventors: Takashi Hattori, Kyoto (JP); Takahiro Kizu, Kyoto (JP); Toshiya Okamoto, Kyoto (JP); Yuichi Nishikawa, Kyoto (JP); Yoshiaki Yamashita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 15 days.

(21) Appl. No.: 16/347,602

(22) PCT Filed: Mar. 30, 2017

(86) PCT No.: PCT/JP2017/013439
§ 371 (c)(1),
(2) Date: May 6, 2019

(87) PCT Pub. No.: WO2018/096705
PCT Pub. Date: May 31, 2018

(65) Prior Publication Data
US 2019/0280566 A1    Sep. 12, 2019

Related U.S. Application Data

(60) Provisional application No. 62/425,668, filed on Nov. 23, 2016.

(51) Int. Cl.
*H02K 3/50* (2006.01)
*H02K 5/16* (2006.01)
(Continued)

(52) U.S. Cl.
CPC ............ *H02K 5/26* (2013.01); *B62D 5/04* (2013.01); *B62D 5/0403* (2013.01);
(Continued)

(58) Field of Classification Search
CPC ............ H02K 3/38; H02K 11/21; H02K 5/12
(Continued)

(56) References Cited

U.S. PATENT DOCUMENTS

2013/0043743 A1* 2/2013 Kim .................. H02K 3/32
310/43
2016/0036296 A1 2/2016 Kabune
(Continued)

FOREIGN PATENT DOCUMENTS

JP    2004-312852 A    11/2004
JP    2004312852 A  *  11/2004
(Continued)

OTHER PUBLICATIONS

Machine Translation JP2004312852 (Year: 2004).*
Official Communication issued in International Patent Application No. PCT/JP2017/013439, dated Jun. 13, 2017

*Primary Examiner* — Jose A Gonzalez Quinones
(74) *Attorney, Agent, or Firm* — Keating & Bennett

(57) ABSTRACT

A motor includes a heat sink including an inner region, and an outer region located radially outward from the inner region. An axial thickness of the inner region is larger than an axial thickness of the outer region, the bottom surface of the outer region is located axially above the bottom surface of the inner region, and the inner region and the electronic component at least partially overlap in an axial direction. A bus bar holder is located axially below the outer region and overlaps the inner region in a radial direction.

8 Claims, 25 Drawing Sheets

(51) Int. Cl.
    *H02K 11/33* (2016.01)
    *H02K 3/12* (2006.01)
    *H02K 3/38* (2006.01)
    *H02K 5/26* (2006.01)
    *B62D 5/04* (2006.01)
    *H02K 5/22* (2006.01)
    *H02K 7/08* (2006.01)
    *H02K 9/22* (2006.01)
    *H02K 15/14* (2006.01)
    *H02K 11/30* (2016.01)
    *H02K 3/04* (2006.01)
    *H02K 5/04* (2006.01)
    *H02K 15/085* (2006.01)
    *H01R 13/52* (2006.01)

(52) U.S. Cl.
    CPC ............ *B62D 5/0409* (2013.01); *H02K 3/04* (2013.01); *H02K 3/12* (2013.01); *H02K 3/38* (2013.01); *H02K 3/50* (2013.01); *H02K 5/04* (2013.01); *H02K 5/161* (2013.01); *H02K 5/22* (2013.01); *H02K 5/225* (2013.01); *H02K 7/08* (2013.01); *H02K 7/083* (2013.01); *H02K 9/22* (2013.01); *H02K 11/30* (2016.01); *H02K 11/33* (2016.01); *H02K 15/085* (2013.01); *H02K 15/14* (2013.01); *H01R 13/52* (2013.01); *H02K 2203/09* (2013.01); *H02K 2211/03* (2013.01)

(58) Field of Classification Search
    USPC .......................................... 310/64, 98, 75 R
    See application file for complete search history.

(56) References Cited

U.S. PATENT DOCUMENTS

2016/0094175 A1   3/2016   Yamasaki
2016/0181885 A1*  6/2016   Yamasaki ............ B62D 5/0403
                                                       180/443
2016/0218596 A1   7/2016   Hayashi
2018/0127020 A1*  5/2018   Asao ...................... B62D 5/046
2018/0198351 A1*  7/2018   Akutsu ................. H02K 7/003
2018/0287462 A1  10/2018  Kabune

FOREIGN PATENT DOCUMENTS

JP      2011-041359 A    2/2011
JP          5373949 B1   12/2013
JP      2016-136829 A    7/2016

* cited by examiner

MOTOR AND ELECTRIC POWER STEERING DEVICE

CROSS REFERENCE TO RELATED APPLICATIONS

This is the U.S. national stage of application No. PCT/JP2017/013439, filed on Mar. 30, 2017, and priority under 35 U.S.C. § 119(a) and 35 U.S.C. § 365(b) is claimed from US Application No. 62/425,668, filed Nov. 23, 2016; the entire contents of which are incorporated herein by reference.

1. FIELD OF THE INVENTION

The present disclosure relates to a motor and an electric power steering device.

2. BACKGROUND

One of the known motors is an electromechanical motor, in which a motor main body with a rotor and stator and a control section with electronic components and a substrate that controls the motor main body are integrated together.

In the conventional motor, the present inventor paid attention to the problem of the large axial dimensions.

SUMMARY

A motor according to an example embodiment of the present disclosure includes a rotor including a shaft that extends axially, a stator that surrounds the radial outer side of the rotor, a heat sink axially above the stator, and a substrate that is axially above the heat sink and includes an electronic component mounted thereon. The stator includes coils defined by windings of coil wires, and a bus bar holder that holds a bus bar that connects the coil wires. The heat sink includes an inner region, and an outer region located radially outward from the inner region. An axial thickness of the inner region is larger than an axial thickness of the outer region. A bottom surface of the outer region is located axially above a bottom surface of the inner region. The inner region and the electronic component at least partially overlap in an axial direction. The bus bar holder is located axially below the outer region and, at the same time, overlaps the inner region in a radial direction.

In an example embodiment of the present disclosure, preferably, the motor further includes a bearing that rotatably supports the shaft. The heat sink holds the bearing, and the bearing and the bus bar holder overlap in a radial direction.

In an example embodiment of the present disclosure, preferably, the heat sink further includes an outer wall portion radially outward from the outer region. The outer wall portion surrounds the radial outer side of the bus bar holder.

In an example embodiment of the present disclosure, preferably, an axial thickness of the outer wall portion is larger than an axial thickness of the inner region.

In an example embodiment of the present disclosure, preferably, at least a portion of the outer wall portion is exposed externally.

In an example embodiment of the present disclosure, preferably, the inner region includes an inner wall portion that extends axially downward from the radial inner edge, and ribs that are provided on the bottom surface and extend radially outward from the inner wall portion.

In an example embodiment of the present disclosure, preferably, the stator includes a stator core including a plurality of core backs arranged around the circumference, and an insulator that covers at least a portion of the stator core. The bus bar holder is fixed to a radial outer side of the insulator or to an axial upper side of the core backs.

In an example embodiment of the present disclosure, preferably, an outer region includes heat sink through-holes into which the coil wires are inserted.

An electric power steering device according to an example embodiment of the present disclosure may include any of the above-described motors.

The above and other elements, features, steps, characteristics and advantages of the present disclosure will become more apparent from the following detailed description of the example embodiments with reference to the attached drawings.

Figure 17:
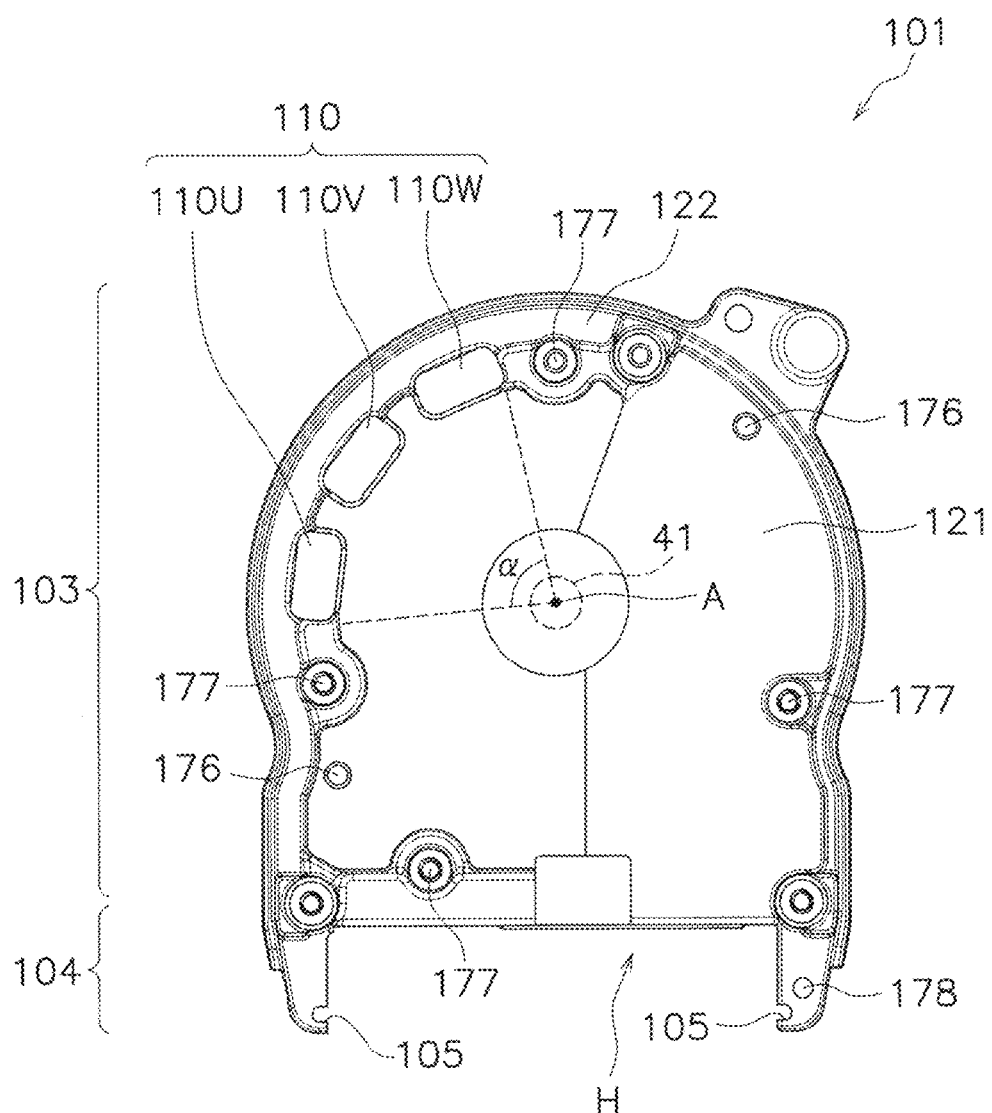
FIG. 17 is a plan view of the heat sink according to Example Embodiment 1.
Figure 19:
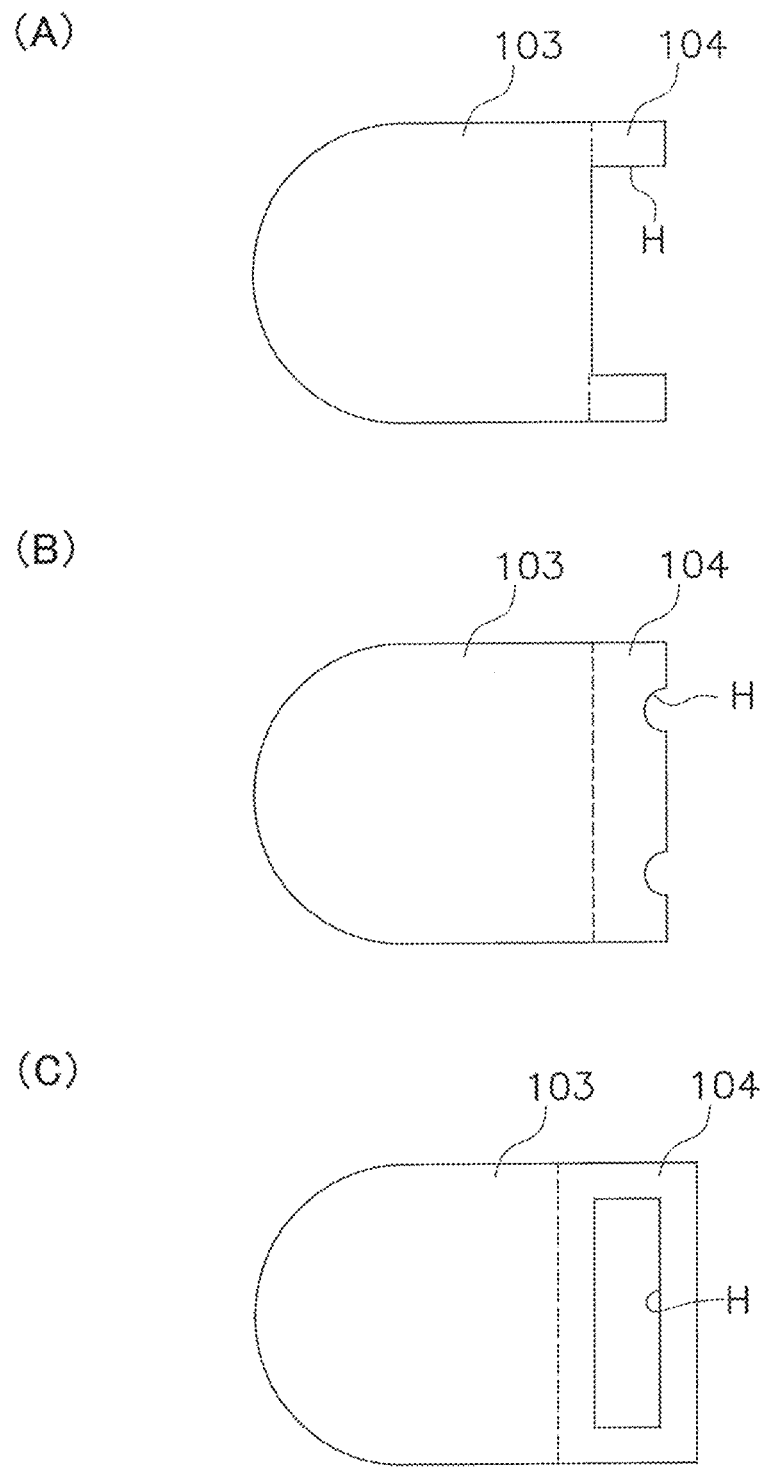

(A) of FIG. 19 is a schematic plan view of FIG. 17, and
 (B) and (C) of FIG. 19 show modifications of (A) of FIG. 19.

Figure 20:
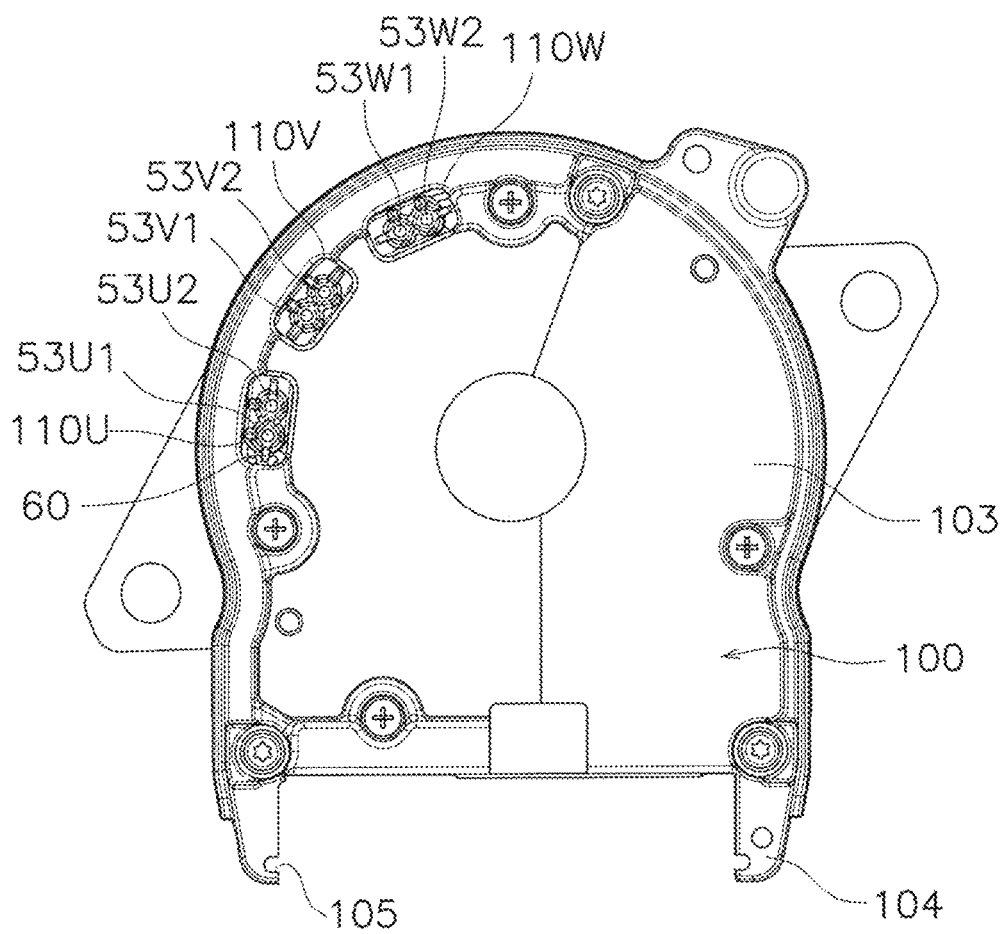

FIG. 20 is a plan view of the coil support member, which supports the coil wires, and heat sink according to Example Embodiment 1.

Figure 21:
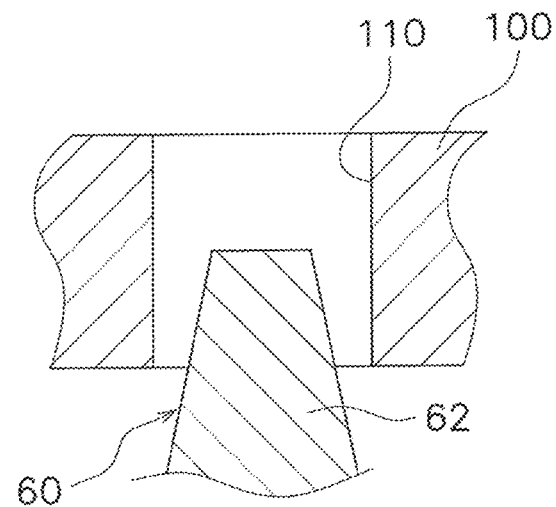

FIG. 21 is a cross-sectional view of the heat sink through-hole and coil support member according to Example Embodiment 1.

Figure 22:
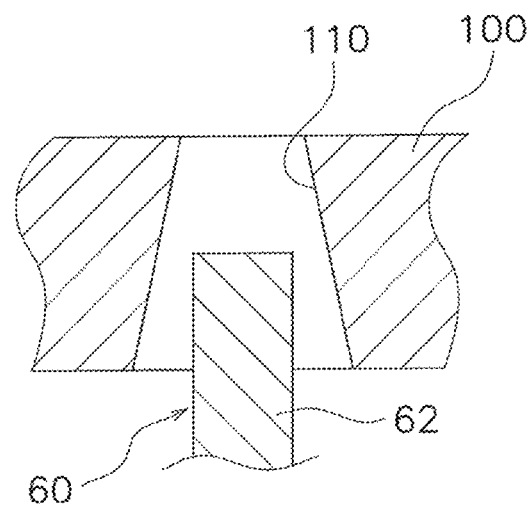

FIG. 22 shows a modification of FIG. 21.

Figure 23:
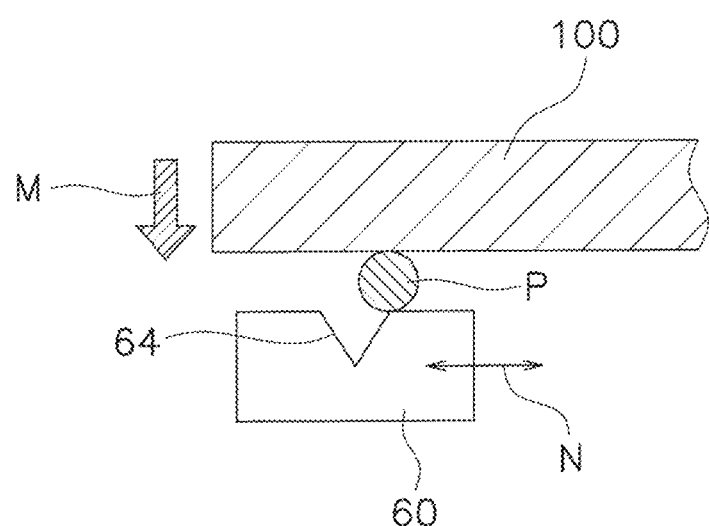

FIG. 23 is a schematic view of a process of inserting the heat sink to the coil support member from above according to Example Embodiment 1.

Figure 24:
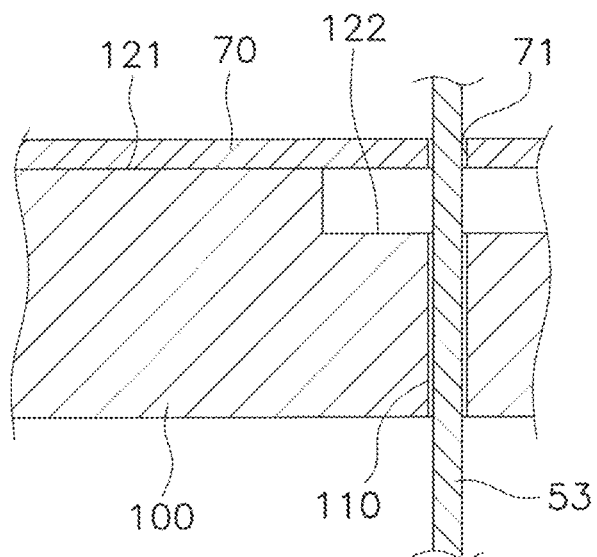
Figure 24:
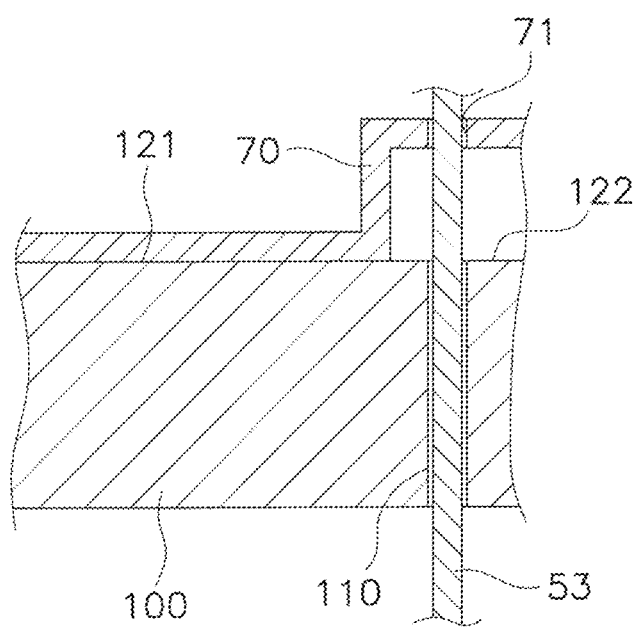

(A) of FIG. 24 is a schematic view of the heat sink and substrate, and (B) of FIG. 24 is a modification of (A) of FIG. 24.

Figure 25:
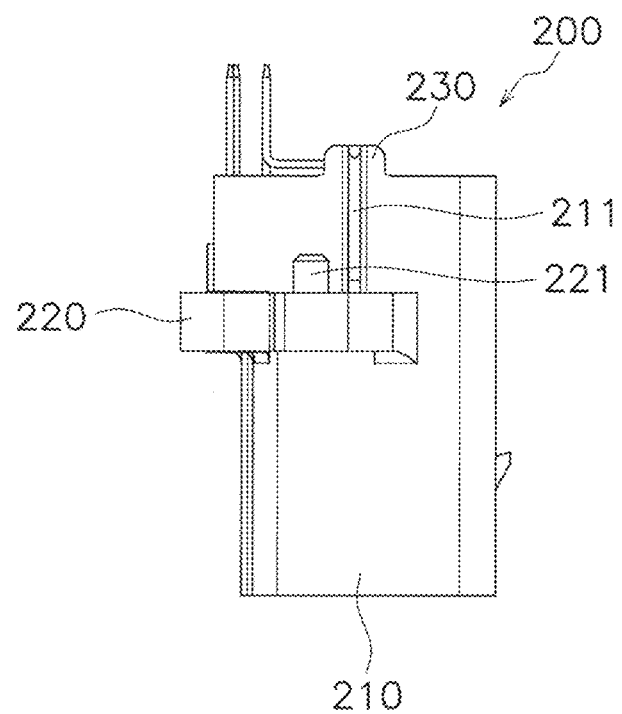

FIG. 25 is a side view of the connector according to Example Embodiment 1.

Figure 26:
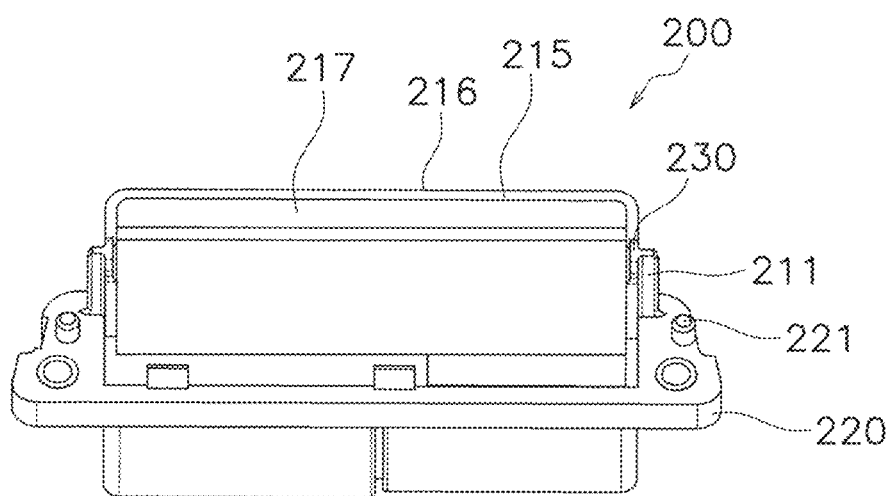

FIG. 26 is a perspective view of the connector according to Example Embodiment 1.

Figure 27:
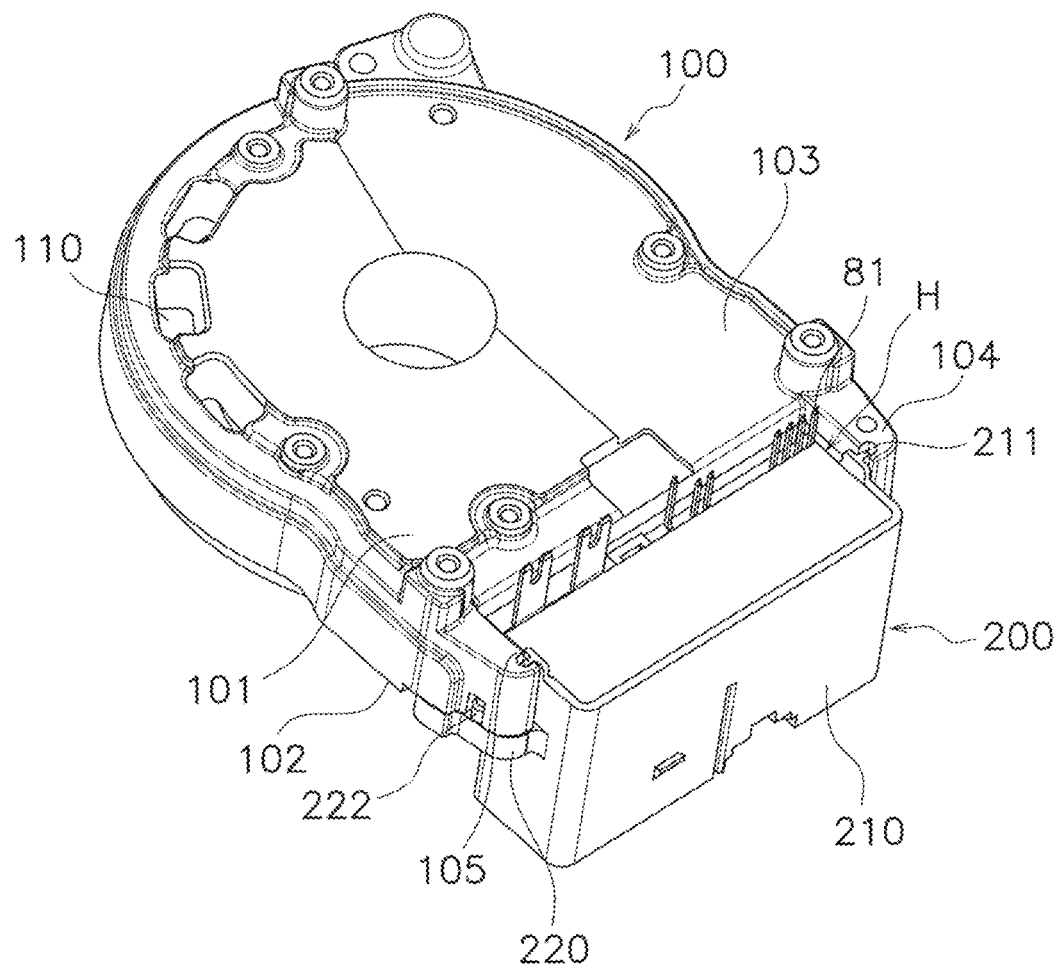

FIG. 27 is a perspective view of the heat sink and connector according to Example Embodiment 1.

Figure 28:
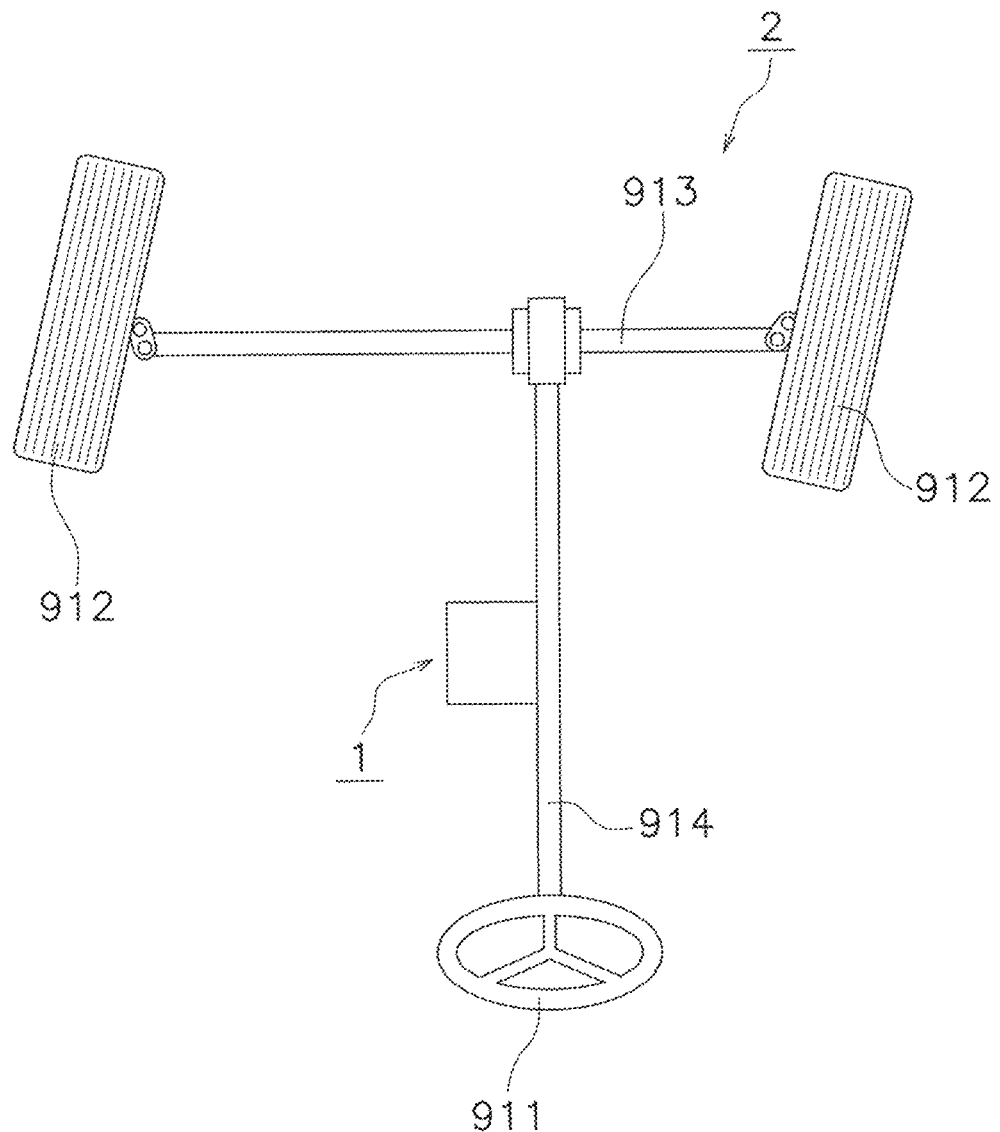

FIG. 28 is a schematic view of an electric power steering device according to Example Embodiment 2.

DETAILED DESCRIPTION

Hereinafter, example embodiments of the present disclosure will be described based on the drawings. In the drawings, the same or equivalent parts will be given the same reference numerals or letters, and redundant descriptions thereof will be omitted.

Figure 1:
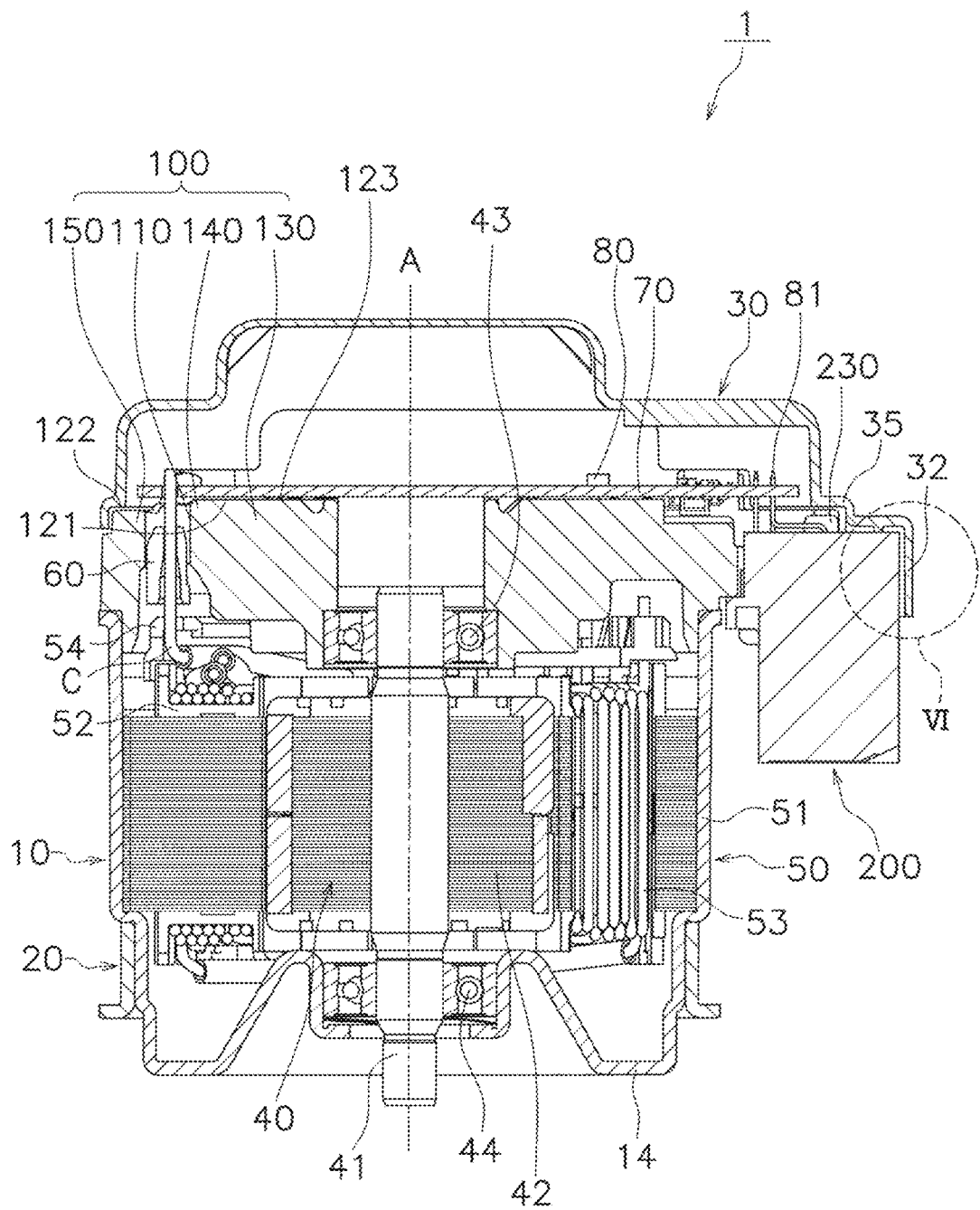
FIG. 1 is a cross-sectional view of a motor according to Example Embodiment 1.

In the following description, as shown in FIG. 1, an axial direction in which the central axis A, i.e., shaft, of the rotor extends is a vertical direction, the substrate is on the upper side, and the bottom of the housing is on the lower side. However, the vertical direction in the present specification is used to specify positional relationships but does not limit actual directions. That is, a downward direction does not always mean a direction of gravitational force.

Also, a radial direction is a direction orthogonal to the central axis A of the rotor, and the radial direction is centered on the central axis A of the rotor. A circumferential direction is the perimeter surrounding the central axis A of the rotor.

Also, in the present specification, the expression "extend axially" involves extending in exactly an axial direction and extending at less than 45 degrees from the axis. Likewise, in the present specification, the expression "extend radially" involves extending in exactly a radial direction and extending at less than 45 degrees from the radius.

Also, in the present specification, the term "fitting (fitting together)" refers to fitting together portions corresponding in shape. The portions corresponding in shape include portions of the same shape, portions similar in shape, and portions of different shapes. If the portions corresponding in shape have projected and recessed shapes, at least part of the projected portion on one side is located within the recessed portion on the other side.

Also, in the present specification, the term "gap" refers to a space that is intentionally provided. That is, a gap is a space that is provided to keep members from coming into contact with each other.

Example Embodiment 1

Referring to FIGS. 1 to 27, a motor according to an example embodiment of the present disclosure will be described. The motor according to Example Embodiment 1 has a dual-system configuration that has two sets of U, V, and W phases.

As shown in FIG. 1, the motor 1 primarily comprises a housing 10, a flange 20, a cover 30, a rotor 40, bearings 43 and 44, a stator 50, a coil support member 60, a control section having a substrate 70 and an electronic component 80, a heat sink 100, and a connector 200.

As shown in FIG. 1, the housing 10 contains the rotor 40, stator 50, and bearings 43 and 44. The housing 10 extends axially and opens upward.

Figure 2:
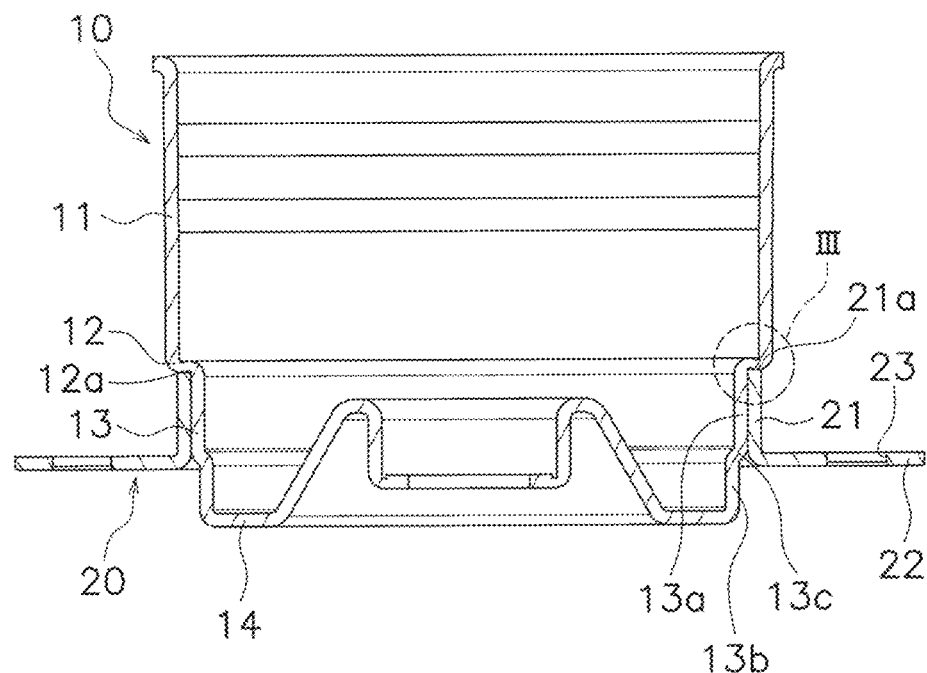
FIG. 2 is a cross-sectional view of the housing and flange according to Example Embodiment 1.

As shown in FIG. 2, the housing 10 comprises a first cylindrical portion 11, a contact portion 12, a second cylindrical portion 13, and a bottom portion 14. The housing 10 of this example embodiment is a press-molded product. The first cylindrical portion 11, contact portion 12, second cylindrical portion 13, and bottom portion 14 are equal in thickness. The term "equal" means that they do not have intentionally different thicknesses, and differences in thickness caused by compression in press molding are deemed equal.

The first cylindrical portion 11 and the second cylindrical portion 13 are cylindrical with respect to the central axis A. The cylindrical is a hollow shape, and may be circular or polygonal when viewed on a plane. The first cylindrical portion 11 contains the stator 50.

The contact portion 12 extends radially inward from the axial lower end of the first cylindrical portion 11. The stator 50 comes into contact with the inside upper surface of the contact portion 12.

Figure 3:
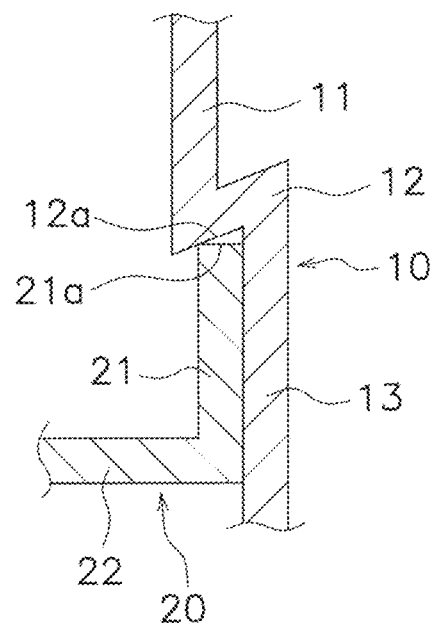
FIG. 3 is an enlarged view of an area corresponding the region III of FIG. 2, in a motor according to a modification of Example Embodiment 1.
Figure 4:
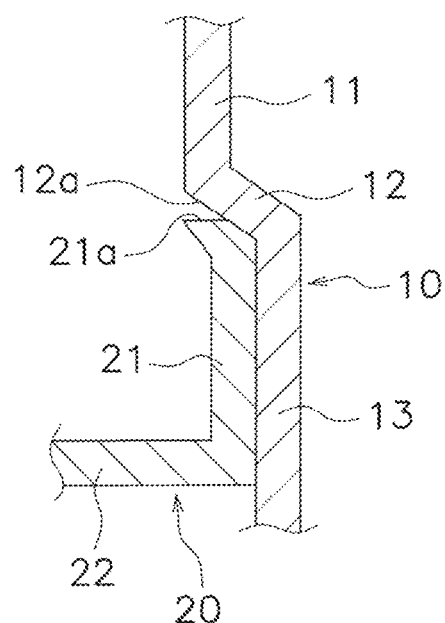
FIG. 4 shows another modification of FIG. 3.

A housing lower surface 12a of the contact portion 12 is a flat surface that extends radially, as shown in FIG. 2. Also, the housing lower surface 12a of the contact portion 12 may extend axially upward as it is directed radially inward from the first cylindrical portion 11, as shown in FIG. 3, or may extend axially downward as it is directed radially inward from the first cylindrical portion 11, as shown in FIG. 4. Also, the housing lower surface 12a of the contact portion 12 may be a curved surface that is not shown in the drawings.

The second cylindrical portion 13 has the shape of a cylinder that extends axially downward from the radial inner edge of the contact portion 12, and has a smaller outer diameter than the first cylindrical portion 11. The second cylindrical portion has an upper cylindrical portion 13a, a lower cylindrical portion 13b, and a connecting portion 13c. The lower cylindrical portion 13b has a smaller outer diameter than the upper cylindrical portion 13a. The connecting portion 13c connects the upper cylindrical portion 13a and the lower cylindrical portion 13b.

The bottom portion 14 extends radially inward from the axial lower end of the second cylindrical portion 13. The bottom portion 14 closes the housing 10.

As shown in FIGS. 1 and 2, the flange 20 is attached to the outer surface of the housing 10.

As shown in FIG. 2, the flange 20 comprises a flange cylindrical portion 21 and a flange flat portion 22. The flange 20 of this example embodiment is a press-molded product. Also, the flange cylindrical portion 21 and the flange flat portion 22 are equal in thickness.

The flange cylindrical portion 21 is fixed to the outer surface of the second cylindrical portion 13 of the housing 10. The flange cylindrical portion 21 is cylindrical with respect to the central axis A, and is larger than the outer diameter of the second cylindrical portion 13. The axial length of the flange cylindrical portion 21 is shorter than the axial length of the second cylindrical portion 13.

As shown in FIGS. 2 and 3, the outer and inner surfaces of the flange cylindrical portion 21 may extend along the axis. Also, as shown in FIG. 4, the upper part of the outer and inner surfaces of the flange cylindrical portion 21 may be sloped.

The flange flat portion 22 extends radially outward from the axial lower end of the flange cylindrical portion 21. The flange flat portion 22 projects radially outward from the first cylindrical portion 11 when viewed from the axial upper side. The flange flat portion 22 has fixing holes 23 for fixing the motor 1 to external equipment at a plurality of points.

As shown in FIGS. 1 to 4, the upper end 21a of the flange cylindrical portion 21 comes into contact with the housing lower surface 12a of the contact portion 12 of the housing 10. That is, at least part of the upper end 21a of the flange cylindrical portion 21 and at least part of the housing lower surface 12a of the contact portion 12 are in contact with each other.

In the contact structure shown in FIG. 2, the housing lower surface 12a of the contact portion 12 is a flat surface that extends radially, the upper end 21a of the flange cylindrical portion 21 is a flat surface that extends radially, and at least part of the flat surface of the contact portion 12 and at least part of the flat surface of the flange cylindrical portion are in contact with each other.

In the contact structure shown in FIG. 3, the contact portion 12 extends axially upward as it is directed radially inward from the first cylindrical portion 11. Since the upper end 21a of the flange cylindrical portion 21 is a flat surface that extends radially, the corner at the upper end surface and inner surface of the flange cylindrical portion 21 fits into the contact portion 12. Thus, the housing 10 seldom falls out of the flange 20.

In the contact structure shown in FIG. 4, the contact portion 12 extends axially downward as it is directed radially inward from the first cylindrical portion 11. The upper end 21a of the flange cylindrical portion 21 comes into contact with the housing lower surface 12a of the contact portion 12, and, at the same time, extends axially outward along the contact portion 12. Thus, the housing 10 seldom falls out of the flange 20.

Figure 5:
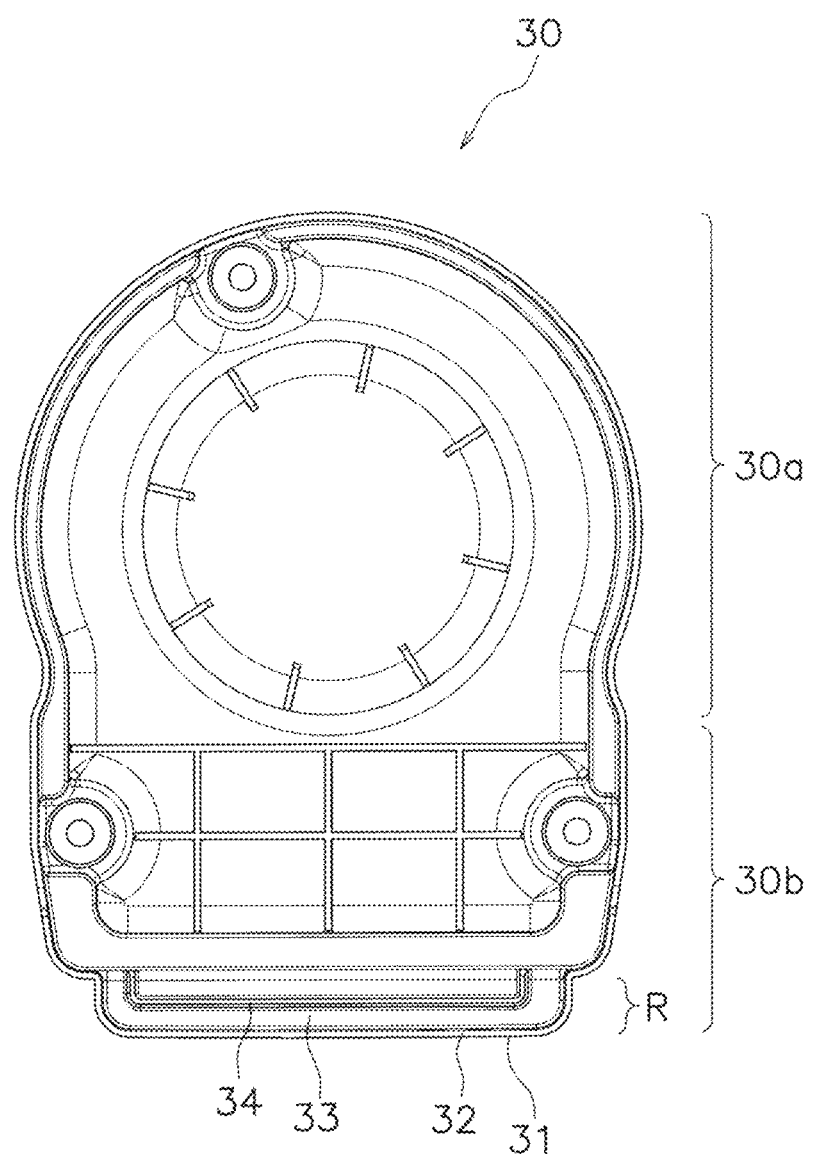
FIG. 5 is a bottom view of the cover according to Example Embodiment 1.

As shown in FIG. 1, the cover 30 covers the substrate 70 and at least part of the axial upper side of the connector 200. As shown in FIG. 5, the cover 30 comprises a disc-like portion 30a that overlaps the housing 10 when viewed from the axial upper side and a rectangular portion 30b facing the connector. The rectangular portion 30b comprises an outer edge region R having a cover outer rim 31 which is a radial outer edge. The term "cover outer rim 31" means an outer edge (an edge of the cover 30), and the term "outer edge region R" means a predetermined region that encompasses the cover outer rim 31 and runs inward from the cover outer rim 31.

Figure 6:
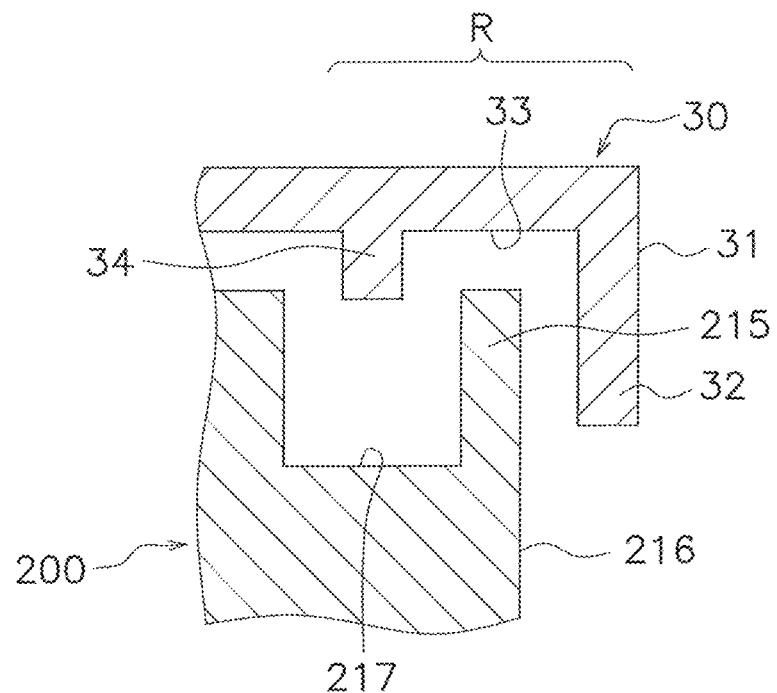
FIG. 6 is an enlarged view of the region VI of FIG. 1.

As shown in FIGS. 5 and 6, the cover 30 comprises a covering wall 32, a cover recess 33, a cover projection 34, and a cover stepped portion 35 (see FIG. 1).

The covering wall 32 extends axially downward from the cover outer rim 31 which is a radial outer edge, and also covers at least part of a connector outer rim 216 which is a radial outer edge of the connector 200 to be described later.

The cover recess 33 is formed radially inward from the covering wall 32, and is depressed axially. As shown in FIG. 6, the axial upper side of the cover recess 33 is a flat surface. The cover recess 33 shown in FIG. 6 is formed by the radial inner surface of the covering wall 32 and the radial outer surface of the cover projection 34.

The cover projection 34, formed radially inward from the cover recess 33, extends axially downward. Specifically, the cover projection 34 extends along the long side of the connector (lateral direction in FIG. 5), and also extends further along the short side (longitudinal direction in FIG. 5) from opposite ends of the long side. As shown in FIG. 6, the axial lower side of the cover projection 34 is a flat surface. The underside of the cover projection 34 is located below the substrate 70. Also, the underside of the cover projection 34 is at the same axial height as the top surface of a connector projection 215 to be described later or located below it.

The cover stepped portion 35 is located radially inward from the cover projection 34, and is recessed axially upward.

Also, the cover recess 33, cover projection 34, and cover stepped portion 35 consist of a plurality of flat surfaces, or may consist of curved surfaces.

Figure 7:
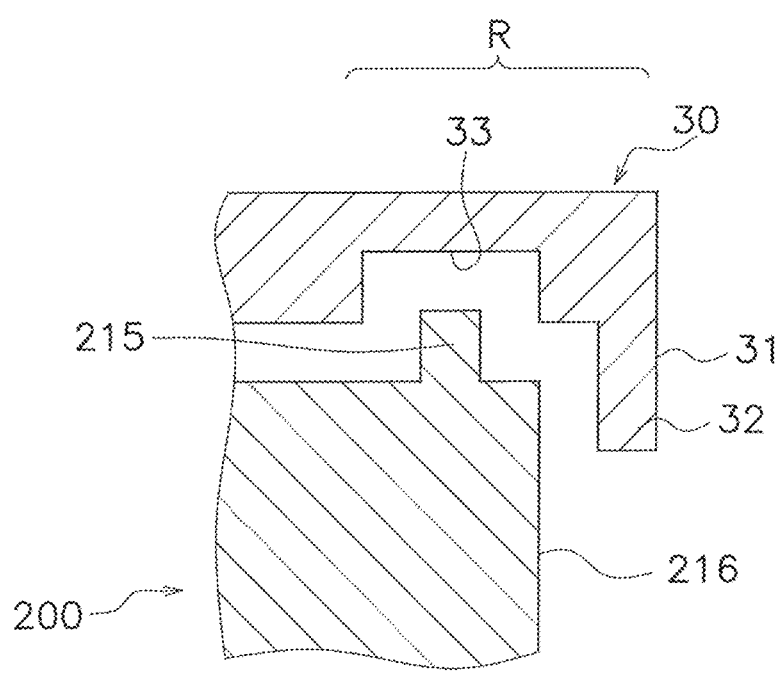
FIG. 7 shows a modification of FIG. 6.
Figure 8:
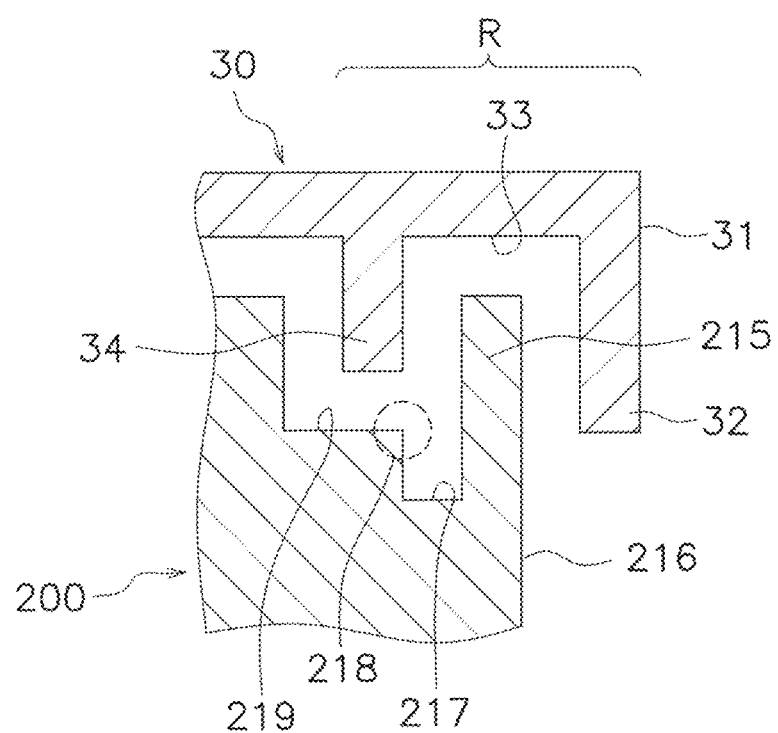
FIG. 8 shows another modification of FIG. 6.
Figure 9:
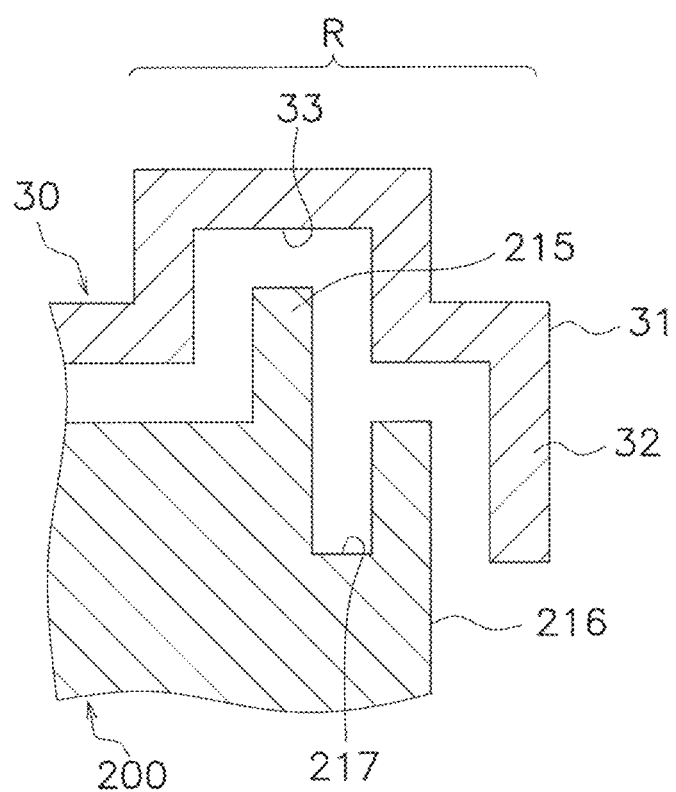
FIG. 9 shows yet another modification of FIG. 6.

Moreover, a modification of the structure of the outer edge region R of the cover 30 will be described with reference to FIGS. 7 to 9. In FIG. 7, the cover recess 33 is not formed of the inner surface of the covering wall 32, and is depressed axially upward, spaced apart from the covering wall 32. In FIG. 8, the lengths at which the covering wall 32 and the cover recess 34 protrude axially downward are approximately equal. In FIG. 9, a stepped structure is provided between the covering wall 32 and the cover recess 33.

As shown in FIG. 1, the rotor 40 comprises a shaft 41 and a rotor core 42. The shaft 41 is in approximately the shape of a cylinder around the central axis A that extends axially. The rotor core 42 is fixed to the shaft 41. The rotor core 42 surrounds the radial outer side of the shaft. The rotor core 42 rotates with the shaft 41.

As shown in FIG. 1, the bearings 43 and 44 rotatably support the shaft 41. The bearing 43 placed on the axial upper side is axially located above the stator 50, and held on the heat sink 100. The bearing 44 placed on the axial lower side is held on the bottom portion 14 of the housing 10.

As shown in FIG. 1, the stator 50 surrounds the radial outer side of the rotor 40. The stator 50 comprises a stator core 51, an insulator 52, coils 53, a bus bar B, and a bus bar holding member 54.

The stator core 51 comprises a plurality of core backs and teeth 51b (see FIG. 10) arranged around the circumference. The core backs are in the shape of a cylinder concentric to the central axis A. The teeth 51b extends radially inward from the inner surfaces of the core backs. The teeth 51b extend radially from the core backs, and are arranged around the circumference, with air gaps (slots) in between.

As shown in FIG. 1, the insulator 52 covers at least part of the stator core 51. The insulator 52 is formed of insulating material, and is attached to each of the teeth 51b.

The coils 53 energize the stator core 51, and are composed of windings of coil wires C. Specifically, the coil wires C are wound around each tooth 51b through the insulator 52, and the coils 53 are placed on each tooth 51b. That is, the coil wires C are concentrated windings. In this example embodiment, the coil wires C are wound around each of two different teeth 51b in a concentrated manner—so-called two teeth in winding. The coil wires C are located radially inward from the radial outer edge of the bus bar holding member 54.

Figure 10:
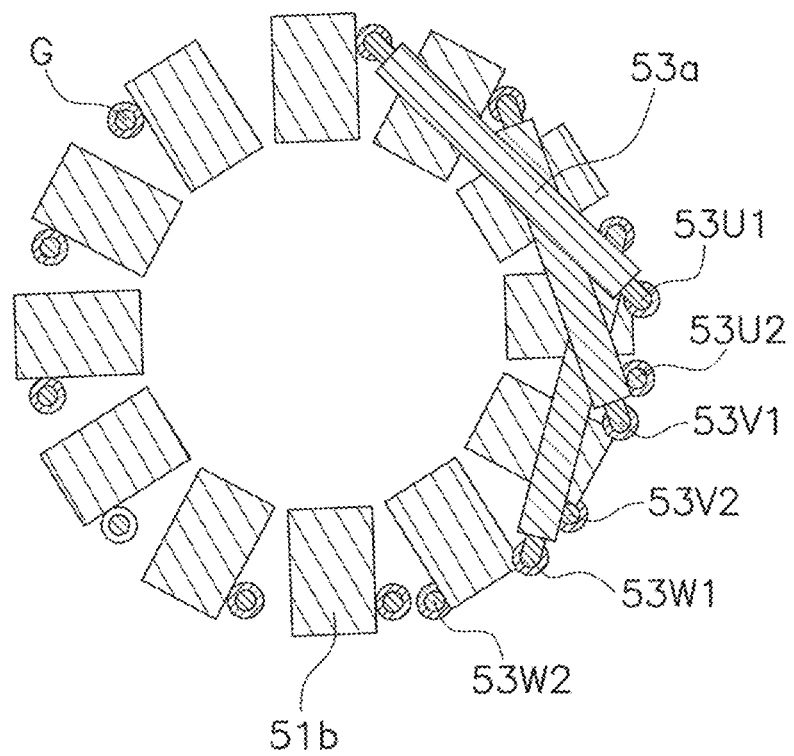
FIG. 10 is a schematic view of the stator according to Example Embodiment 1.

One ends of the coil wires C are connected to the bus bar B. The other ends of the coil wires C are inserted into the coil support member 60 to be described later and connected to the substrate 70. The other ends of the coil wires C of this example embodiment are wires pulled out from the coils 53—specifically, six pullout wires 53U1, 53U2, 53V1, 53V2, 53W1, and 53W2 constituting each of the U, V, and W phases in first and second systems, as shown in FIG. 10. The pullout wires 53U1, 53U2, 53V1, 53V2, 53W1, and 53W2 pulled out from the stator 50 are inserted into through-holes 65 (see FIG. 12) of the coil support member 60 and heat sink through-holes 110 (see FIG. 17) which are to be described later, and are electrically connected to the control section by soldering or the like.

Also, the pullout wires 53U1, 53U2, 53V1, 53V2, 53W1, and 53W2 are collected by a connecting wire 53a, in an area that is at 180 degrees or less relative to the shaft.

When driving the motor 1, current flows through each of the pullout wires 53U1, 53V1, and 53W1 constituting the layers of each of the U, V, and W phases in the first system, and current flows through each of the pullout wires 53U2, 53V2, and 53W2 constituting the layers of each of the U, V, and W phases in the second system. With this configuration, when driving the motor 1, even if the energization of the coils in one system is stopped due to an inverter failure or the like, the coils in the other system can be energized, thereby enabling the driving of the motor 1.

While the motor 1 in this example embodiment has a dual-system configuration that has two sets of U, V, and W phases, the number of systems may be arbitrarily set. That is, the motor 1 may be configured in one system, or in three systems or more.

The bus bar B is a member that is formed of conductive material that electrically connects coil wires pulled out from the coils 53. The bus bar B in this example embodiment is a bus bar for a neutral point in a star connection.

Figure 11:
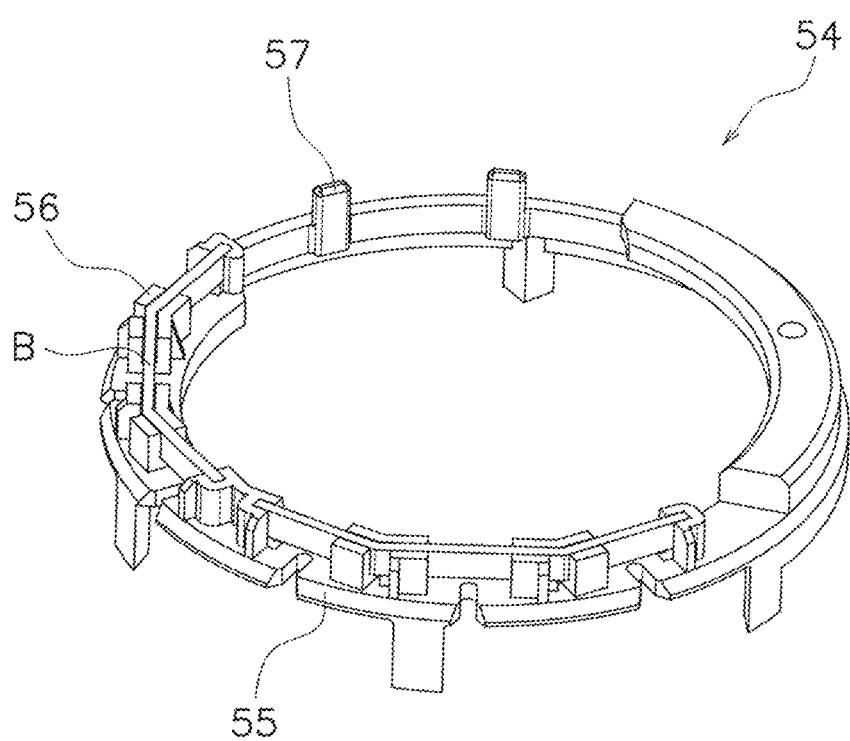
FIG. 11 is a perspective view of the bus bar holding member according to Example Embodiment 1.

The bus bar holding member 54 shown in FIG. 11 holds the bus bar B. The bus bar holding member 54 is formed of insulating material. As shown in FIG. 1, the bus bar holding member 54 is fixed to the radial outer side of the insulator 52 or to the axial upper side of the core backs. The bus bar holding member 54 and the bearing 43 overlap in a radial direction.

As shown in FIG. 11, the bus bar holding member 54 has a ring-shaped base 55, a holding portion 56 for holding the bus bar B, and a bus bar projection 57. The bus bar projection 57 and the holding portion 56 extend axially upward from one part of the base 55, and placed at different positions on the circumference.

The stator 50 has a stator fitting portion which is a projected or recessed portion that extends axially. In this example embodiment, the stator fitting portion is a bus bar projection 57 that extends axially. Also, the stator fitting portion may be a recess (not shown) that is formed on the bus bar holding member 54 and depressed axially downward. Moreover, the stator fitting portion may be a projection or recess that is formed on the upper end of the stator core 51, insulator 52, etc.

As shown in FIG. 1, the coil support member 60 supports conductive members such as coil wires C. The coil support member 60 is formed of insulating material. The coil support member 60 is placed axially above the stator 50, with the coil wires C inserted in it.

Figure 12:
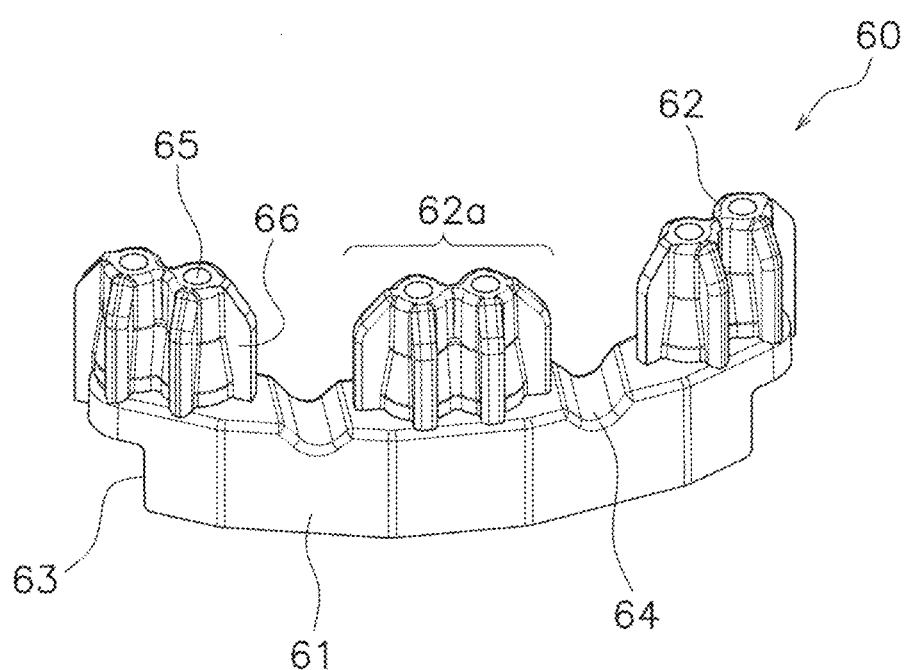
FIG. 12 is a perspective view of the coil support member according to Example Embodiment 1.

As shown in FIG. 12, the coil support member 60 comprises a base 61 and a coil support 62 extending axially upward from the base 61.

Figure 13:
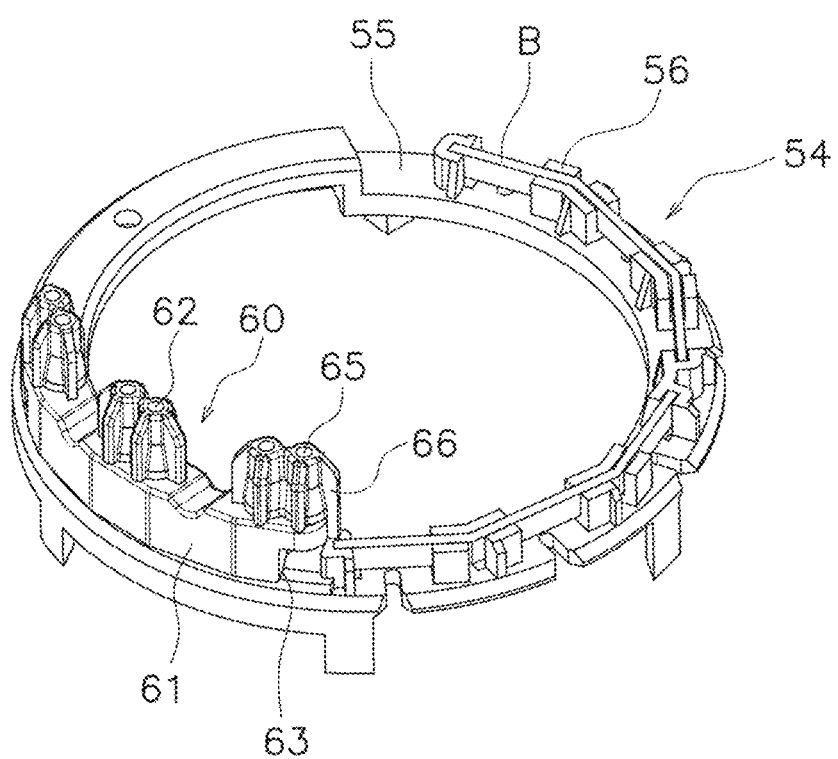
FIG. 13 is a perspective view of the bus bar holding member and coil support member according to Example Embodiment 1.
Figure 14:
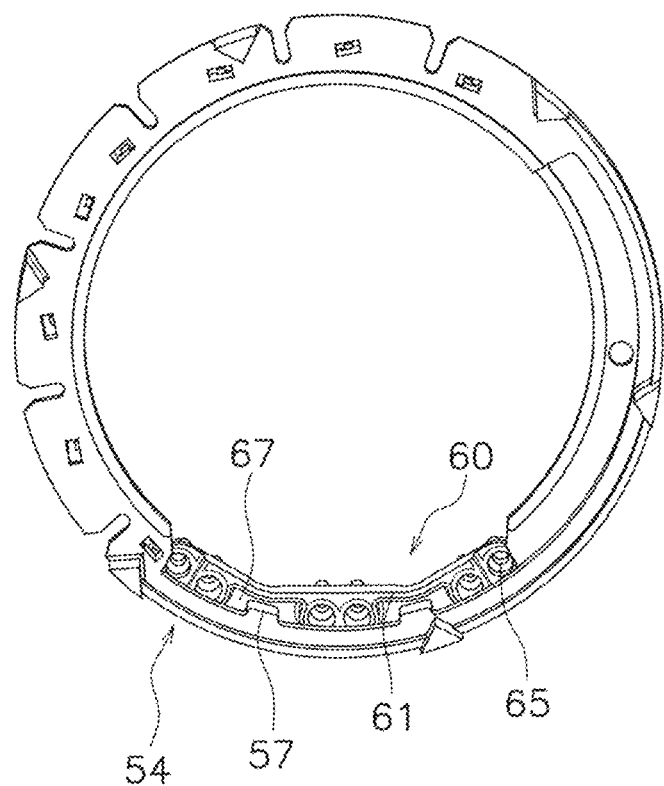
FIG. 14 is a bottom view of the bus bar holding member and coil support member according to Example Embodiment 1.

The base 61 is placed on the top surface of the stator 50. In this example embodiment, the stator fitting portion is formed on the bus bar holding member 54. Accordingly, as shown in FIGS. 13 and 14, the base 61 is located on the top surface of the bus bar holding member 54. In a case where the stator fitting portion is formed on the stator core 51, the base 61 is located on the top surface of the stator core 51. In a case where the stator fitting portion is formed on the insulator 52, the base 61 is located on the top surface of the insulator 52.

As shown in FIGS. 12 and 13, notches 63 are formed in the axial lower part of the base 61, at either end on the circumference. The notches 63 are cut axially upward from the bottom, at either end on the circumference.

The base 61 has grooves 64 that are formed on the upper edge and extend radially. The grooves 64 are located axially above the upper edge surface of the housing 10.

The radial outer surface of the base 61 consists of a plurality of faces. In this example embodiment, the radial outer surface of the base 61 has five faces. The radial outer surface of the base 61 may have a curved shape.

The coil supports 62 have through-holes 65 for inserting coil wires. The coil wires in this example embodiment include six pullout wires 53U1, 53U2, 53V1, 53V2, 53W1, and 53W2 constituting each of the U, V, and W phases in first and second systems. Since one through-hole 65 holds one pullout wire, six coil supports 62 each having a through-hole 65 are provided on the base 61. In this example embodiment, coil supports 62 for inserting coil wires of the same phase form a protruding portion 62a adjacent to them, without a gap in between. That is, the protruding portion 62a has a portion forming a through-hole 65 for inserting coil wires of the same phase and ribs 66 to be described later. The protruding portion 62a is provided for each of the U, V, and W phases, and the protruding portions 62a are juxtaposed at intervals.

At least part of the coil supports 62 is located within a heat sink through-hole 110 to be described later. The width of the coil supports 62 shown in FIG. 12 becomes equal to or larger than the width of the heat sink through-hole 110, from the axial upper side toward the bottom. The width of the upper side of the coil supports 62 is smaller than the width of the lower side thereof. The coil supports 62 are tapered toward the top.

The coil supports 62 have ribs 66 that extend in a direction crossing the axis. In this example embodiment, the protruding portions 62a have ribs extending to either side of the protruding portions 62a on the circumference and ribs radially extending to either side from the through-holes 65. As such, each protruding portion 62a has six ribs 66. The width of the ribs 66 become equal to or smaller than the width of the heat sink through-hole 110, from the axial lower side toward the top. Due to this, the coil supports 62 having ribs 66 in this example embodiment are tapered toward the axial upper side. The protruding portions 62a also are tapered toward the axial upper side.

As shown in FIG. 14, the base 61 is fitted to the stator 50 through a gap. The base 61 and the stator 50 may be in partial contact with each other; preferably, they may be arranged through a gap in a direction perpendicular to the axis (including radial and circumferential directions). In the latter case, the entire coil support member 60 is movable relative to the stator 50 when assembling the motor 1. In this example embodiment, the base 61 and the stator 50 are arranged through a gap in a circumferential direction.

The base 61 has a coil support member fitting portion 67 which is a projected or recessed portion that extends axially. The stator fitting portion and the coil support member fitting portion 67 are fitted together through a gap by each other's recess and projection.

The radial width of the recess of the stator fitting portion or coil support member fitting portion 67 is larger than the radial width of the projection of the coil support member fitting portion 67 or stator fitting portion. The circumferential width of the recess of the stator fitting portion or coil support member fitting portion 67 is larger than the circumferential width of the projection of the coil support member fitting portion 67 or stator fitting portion. Moreover, the stator fitting portion is a projected portion, and the coil support member fitting portion 67 is a recessed portion, and it is preferable that they are fitted together through a gap in a circumferential direction. In other words, the stator 50 has a projection that extends axially, the base 61 has a recess that extends axially, the projection of the stator 50 and the recess of the base 61 are fitted together through a gap in a circumferential direction, and the circumferential width of the recess of the base 61 is larger than the circumferential width of the projection of the stator 50.

Moreover, in this example embodiment, the coil support member fitting portion 67 is a recessed portion that is formed on the base 61, and the stator fitting portion is a bus bar projection 57 that is formed on the bus bar holding member 54.

In this way, the stator 50 and the coil support member 60 are fitted together by their projected and recessed shapes, thereby placing the coil support member 60 in a predetermined position. Also, since they are fitted together through a gap, the position of the coil support member 60 may be adjusted by an amount equal to the width of the gap. Accordingly, it is possible to insert the heat sink 100 while adjusting the position of the coil support member 60, thereby allowing for easy assembling. In addition, the projected and recessed shapes may be reversed to satisfy the above functionality.

Further, the bus bar holding member 54 needs to be fixed as part of the stator 50 because the bus bar and the coil pullout wires need to be fixed by welding. Meanwhile, the coil support member 60 may be moved as long as the coil pullout wires are positioned.

The coil support member fitting portion 67 is located between neighboring coil supports 62 on the base 61. In other words, the coil support member fitting portion 67 is located between neighboring protruding portions 62a on the base 61. Also, the coil support member fitting portion 67 is located on the axial lower surface of the base 61, and extends along the circumference (side by side).

The control section controls the motor main body having the rotor 40 and stator 50, and, as shown in FIG. 1, comprises a substrate 70 and an electronic component 80 mounted on the substrate 70. The substrate 70 is placed axially above the stator 50 in such a way as to widen out radially, and fixed to the axial upper side of the heat sink 100. The electronic component 80 is mounted on at least one of the top and bottom surfaces of the substrate 70.

Figure 15:
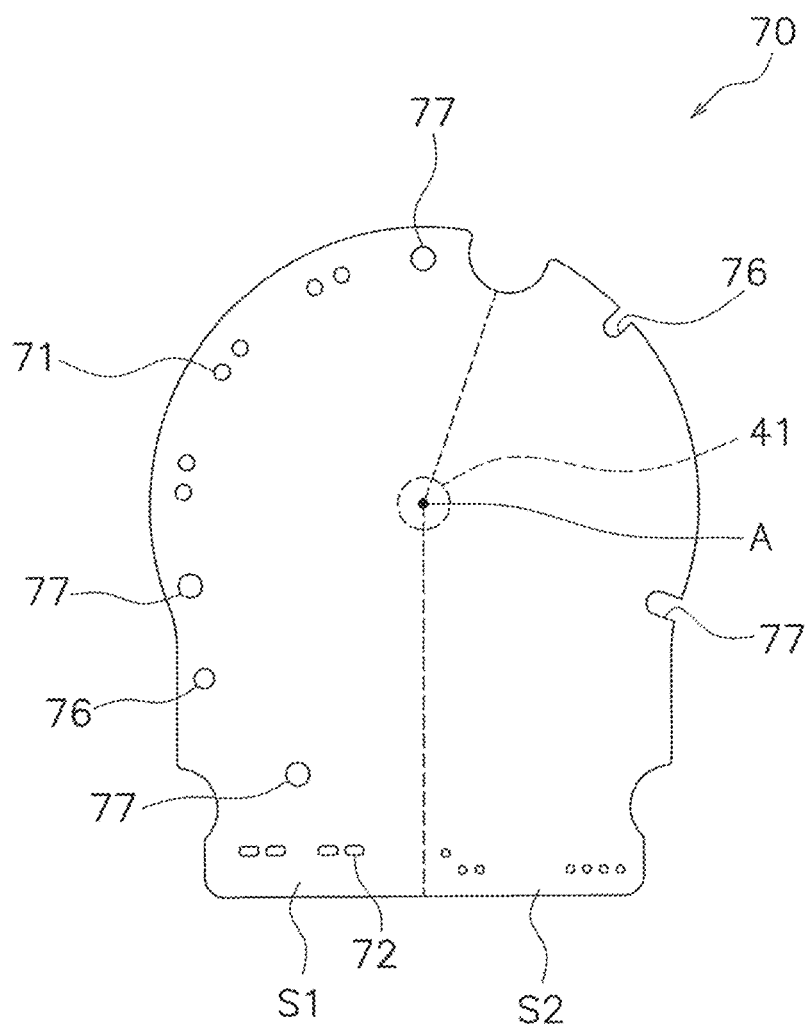
FIG. 15 is a bottom view of the substrate according to Example Embodiment 1.

As shown in FIG. 15, the substrate 70 has a first region S1 where power elements are mounted and a second region S2 where control elements are mounted. The first region S1 is an area that is at 180 degrees or more relative to the central axis A of the shaft 41 when viewed from the axial upper side.

Here, the first region S1 and the second region S2 may be defined when the power elements and the control elements are separately placed on the substrate 70 in a circumferential direction. Accordingly, this does not apply where the power elements and the control elements are irregularly scattered on the substrate 70 or where the power elements and the control elements are separately placed in the same circumferential direction and radial direction.

Moreover, the first region S1 and the second region S2 are regions that are defined by an angle relative to the shaft 41 (central axis A). For example, in the first region S1, even if the power elements are concentrated on the radial inner side of the substrate 70, the radial outer side of the substrate 70 is regarded as the first region S1.

Here, the power elements refer to elements on a circuit that connect coil wires to an external power source, and the control elements refer to elements on a circuit that connect signal lines detected by a magnetic sensor to an external control device. The power elements may include a choke coil, FET, condenser, etc., and the control elements may include a microcomputer, etc.

As shown in FIG. 15, the substrate 70 has substrate through-holes 71 and 72 for passing conductive members through. The conductive members are members that are connected to the substrate 70 and distribute electricity—for example, connector pins 81 (see FIG. 1), coil wires C wound around the stator 50, etc. In this example embodiment, the coil wires are inserted through the substrate through-holes 71, and the connector pins 81 are inserted through the substrate through-holes 72. Also, the coil wires C and the connector pins 81 are fixed to the substrate 70 by soldering connections.

Figure 16:
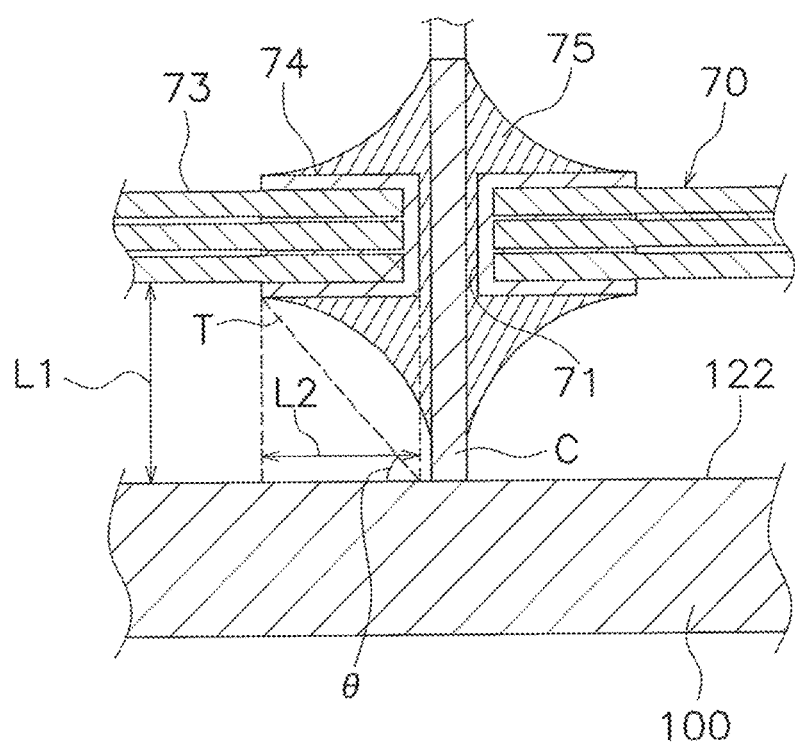
FIG. 16 is a cross-sectional view of the substrate and conductive member according to Example Embodiment 1.

Specifically, as shown in FIG. 16, the substrate 70 comprises a printed circuit board 73 and a land 74 that surrounds the substrate through-holes 71 formed in the printed circuit board 73. The land 74 is located on the top and bottom surfaces of the printed circuit board 73 and the inner surfaces of the substrate through-holes 71.

As shown in FIG. 15, the substrate 70 is formed with positioning holes 76 corresponding to second positioning recesses 176 (see FIG. 17) of the heat sink 100, so that the substrate 70 is positioned relative to the heat sink 100. The positioning holes 76 include round holes, notched holes, etc.

Also, the substrate 70 is formed with fixing holes 77 corresponding to fixing holes 177 (see FIG. 17) of a heat sink body 103, in order to fix the substrate 70 to the heat sink 100. The fixing holes 77 include round holes, notched holes, etc.

A first positioning hole 178 penetrates the heat sink top surface 101 and the heat sink bottom surface 102. When processing the heat sink top surface 101, the second positioning recesses 176 are formed with respect to the first positioning hole 178. Likewise, when processing the heat sink bottom surface 102, a first positioning recess 179 is formed with respect to the first positioning hole 178. Accordingly, the first positioning recess 179 and second positioning recesses 176 are positioned with respect to the first positioning hole 178.

Therefore, the connector 200 is positioned by the first positioning recess 179, and the substrate 70 is positioned by the second positioning recesses 176. Accordingly, the connector pins 81 may be easily connected without displacement between the heat sink 100 and the connector 200.

The substrate 70 or electronic component 80 and the conductive members (the substrate 70 and coil wires C in FIG. 16) are connected by connecting members 75. The connecting members 75 include a conductive adhesive, a solder, etc., and the solder is used in this example embodiment. The solder is placed in such a way as to connect to the top and bottom surfaces of the substrate 70 and the inside of the substrate through-holes 71 for passing conductive members through. The entire solder is located axially above an exposed surface 122 (see FIG. 1) of the heat sink 100 to be described later.

As shown in FIG. 1, the heat sink 100 is placed axially above the stator 50, facing the substrate 70 in an axial direction.

The heat sink 100 has the function of absorbing heat from the electronic component 80 mounted on the substrate 70 and releasing it, and is formed of a low heat-resistance material.

The heat sink 100 is also used as a bearing holder because it holds the bearing 43. In this example embodiment, since the bearing holder and the heat sink are integrated as one, the number of parts, the number of assembly points, and the costs associated with them may be reduced. Further, it is possible to suppress thermal resistance, which may be generated when the bearing holder and the heat sink are provided as separate units, thereby facilitating heat transfer to the outside.

Figure 18:
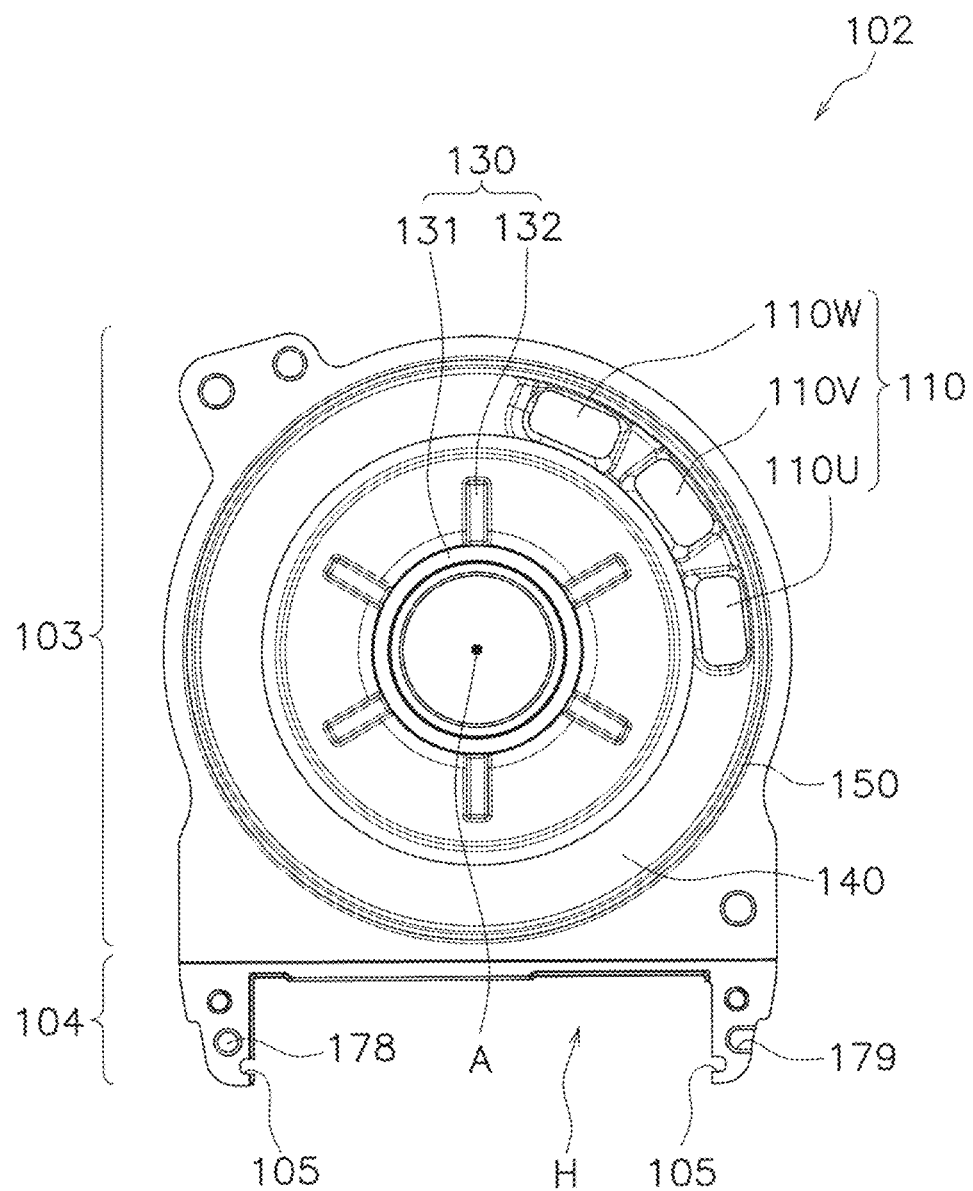
FIG. 18 is a bottom view of the heat sink according to Example Embodiment 1.

The heat sink 100 has the heat sink top surface 101 shown in FIG. 17 and the heat sink bottom surface 102 shown in FIG. 18. The heat sink top surface 101 faces the substrate 70, and the heat sink bottom surface 102 faces the stator 50.

As shown in FIGS. 17 and 18, the heat sink 100 has a heat sink body 103 and heat sink protrusions 104 that connect to the heat sink body 103 and extend radially outward from the housing 10.

The heat sink body 103 overlaps the housing 10 containing the rotor 40 and stator 50 when viewed from the axial upper side. The heat sink protrusions 104 protrude radially from the heat sink body 103, and cover at least part of the long side (lateral direction in FIGS. 17 and 18) of the connector 200.

A plurality of heat sink protrusions 104 shown in FIGS. 17 and 18 may be formed at intervals. Specifically, the heat sink protrusions 104 protrude from one end and the other end (upper and lower ends in (A) of FIG. 19) of the radial outer edge (the right edge of the heat sink body 103 in (A) of FIG. 19) of the connector 200 at the heat sink body 103.

Here, the heat sink protrusions 104 protrude in a rod-like shape when viewed on a plane, as shown in (A) of FIG. 19, and forms an approximately U-shape at the heat sink body 103 when placed only on two opposite ends. Moreover, the heat sink protrusions 104 may protrude in a plate-like shape as shown in (B) of FIG. 19, or in a ring-like shape as shown in (C) of FIG. 19. If the heat sink protrusions 104 protrude in a rod-like shape when viewed on a plane, one or three or more heat sink protrusions 104 may be provided, or the heat sink protrusions 104 may not be provided at the two ends.

The heat sink protrusions 104 each have a heat sink recess or heat sink projection that extends axially, so as to be fitted to the connector 200 to be described later. The heat sink recess or heat sink projection extends along the axis. In FIGS. 17 and 18, heat sink recesses 105 are formed on the inner surfaces of the heat sink protrusions 104 located at one end and the other end of the long side of the connector 200. The inner surfaces of the heat sink protrusions 104 are surfaces opposite the connector 200.

In this example embodiment, the heat sink protrusions 104 correspond to an exposed surface 122 (see FIG. 1). That is, a gap is provided between the heat sink protrusions 104 and the substrate 70. Accordingly, in a preliminary process in which the cover 30 is mounted, it is possible to see with the naked eye whether the connector pins 81 are connected to the substrate 70 from the long side of the connector 200.

The heat sink 100 is formed with cavities H that pass conductive members through them and extend axially. The cavities H include through-holes, notches, etc.

If the conductive members are connector pins 81, a cavity H for passing the conductive members through is formed by the heat sink body 103 and two heat sink protrusions 104, in the structure shown in FIGS. 17 and 18 and (A) of FIG. 19 which schematically show FIGS. 17 and 18. Particularly, the cavity H is formed by the radial outer edge of the connector at the heat sink body 103 and two heat sink protrusions 104.

In the structure shown in (B) of FIG. 19 according to a modification where notches are formed on the radial outer edge of the heat sink protrusion 104, the notches form a cavity H. In the structure shown in (C) of FIG. 19 according to another modification where the heat sink protrusion 104 has a ring-like shape, a hollow hole forming a ring-like shape forms a cavity H.

Further, if the conductive members are coil wires from the stator 50, heat sink through-holes 110 that allow the coil wires to pass through and extend axially are formed as cavities H, as shown in FIGS. 17 and 18.

In this way, the cavities H in the heat sink 100 shown in FIGS. 17 and 18 include a cavity for conductive members from the connector, which is formed by the radial outer edge surface of the heat sink body 103 and the inner edge surfaces of the two heat sink protrusions 104, and heat sink through-holes 110 for the coil wires.

As shown in FIGS. 17, 18, and 20, the heat sink through-holes 110 allow conductive members such as coil wires to pass through and extend axially. Due to this, the heat sink through-holes 110 may position the conductive members. The heat sink through-holes 110 in this example embodiment support the coil support member 60 supporting the coil wires, as shown in FIGS. 1 and 20.

A plurality of heat sink through-holes 110 are placed adjacent to each other in a circumferential direction. Specifically, a plurality of heat sink through-holes 110U, 110V, and 110W are spaced at intervals in a circumferential direction. That is, a plurality of heat sink through-holes 110U, 110V, and 110W are concentrically arranged at intervals.

As shown in FIG. 17, the plurality of heat sink through-holes 110U, 110V, and 110W are located in an area where the central angle $\alpha$ is 180 degrees or less with respect to the shaft 41 (central axis A) when viewed from the axial upper side. That is, the heat sink through-holes 110U, 110V, and 110W are concentrated on one side. Preferably, the number of slots is six or more, the number of phases is 3, and the central angle $\alpha$ is "(360 degrees/number of slots)×3" degrees or less.

Incidentally, the term "phase" in the above expression is the number of independent coils on a stationary stator, and a three-phase motor is a motor that has three independent coils at 120 degree intervals—in this example embodiment, a three-phase motor with U, V, and W phases. The term "slot" in the above expression represents the number of grooves between the teeth, which is multiples of three in the case of the three-phase motor. In this example embodiment, the central angle $\alpha$ is preferably 90 degrees or less since the motor has three phases and 12 slots.

Like the heat sink through-holes 110U, 110V, and 110W, it is desirable that the coil pullout wires 53U1, 53U2, 53V1, 53V2, 53W1, and 53W2 are located within the central angle $\alpha$. By using the connecting wire 53a, the coil pullout wires may be located within the central angle $\alpha$.

As shown in FIG. 20, a plurality of coil wires of the same phase are inserted into each of the plurality of heat sink through-holes 110U, 110V, and 110W. That is, one protruding portion 62a of the coil support member 60 is held on each of the plurality of heat sink through-holes 110U, 110V, and 110W. The plurality of heat sink through-holes 110U, 110V, and 110W are separate holes for each phase of coil wires. That is, the plurality of heat sink through-holes 110U, 110V, and 110W are independent from one another and are not connected. In particular, two U-phase coils—that is, only the pullout wires 53U1 and 53U2—are inserted into the heat sink through-hole 110U. Two V-phase coils—that is, only the pullout wires 53V1 and 53V2—are inserted into the heat sink through-hole 110V. Two W-phase coils—that is, only the pullout wires 53W1 and 53W2—are inserted into the heat sink through-hole 110W.

When viewed from the axial upper side, the heat sink through-holes 110U, 110V, and 110W face the inside of the first region S1 in the substrate 70 where power elements are mounted. For this reason, the heat sink through-holes 110U, 110V, and 110W for passing the coil wires through are formed in the first region S1 in the substrate 70 where power elements are mounted.

Incidentally, the heat sink through-holes 110U, 110V, and 110W may be configured to run across the first region S1 where power elements are mounted and the second region S2 where control elements are mounted, when viewed from the axial upper side. Further, when viewed from the axial upper side, some part of the heat sink through-holes may correspond to the first region S1, and the rest of it may correspond to the second region S2.

As shown in FIG. 1, at least part of the coil supports 62 is located in the heat sink through-holes 110. As shown in FIGS. 1, 21, and 22, the gap between the coil support 62 and the heat sink through-hole 110 gets narrower or equal toward the bottom.

Specifically, as shown in FIG. 21, the width of the upper end of the coil support 62 is smaller than the width of the lower end of the heat sink through-hole 110, and the width of the coil support 62 becomes equal or larger toward the bottom from the axial upper side. More specifically, the heat sink through-hole 110 has a constant width, and the coil support 62 has a tapered shape in which the side becomes wider toward the bottom.

Further, as shown in FIG. 22, the width of the lower end of the heat sink through-hole 110 is larger than the width of the upper end of the coil support 62, and the width of the heat sink through-hole 110 becomes equal or smaller toward the top from the axial lower side. More specifically, the heat sink through-hole 110 has a tapered shape in which it becomes wider toward the bottom, and the lateral width of the coil support 62 is constant.

Further, while the width of the upper end of the heat sink through-hole 110 in FIGS. 21 and 22 is larger than the width of the coil support 62, the width of the upper end of the heat sink through-hole 110 may be smaller than the width of the coil support 62.

Thus, since the gap between the coil support 62 and the heat sink through-hole 110 gets equal or wider toward the top from the bottom, the heat sink through-hole 110 may be easily inserted from above the coil support member 60 when assembling the motor 1.

Further, the grooves 64 (see FIG. 12) on the coil support member 60 make positioning easy when inserting the heat sink 100 from above the coil support member 60. The reason for this is as follows. As shown in FIG. 23, if the heat sink 100 is inserted to the coil support member 60 from the axial upper side, as indicated by the arrow M, with a pin P being inserted radially near the groove 64 on the upper edge surface of the base 61, the heat sink 100 pushes the pin P, causing the pin P to move to the groove 64. Since the coil support member 60 moves as indicated by the arrow N in response to the pushing force of the pin P, the heat sink 100 and coil support member 60 may be positioned. Positioning is done as the coil support 62 is inserted into the heat sink through-hole 110. The inserted pin P may be easily removed because the groove 64 is located axially above the upper edge surface of the housing 10.

As shown in FIG. 1, the heat sink 100 has a contact surface 121 and an exposed surface 122. The contact surface 121 and the exposed surface 122 are located on the top surface of the heat sink 100 shown in FIG. 17.

The contact surface 121 comes into contact with the substrate 70 or electronic component 80 directly or via a heat dissipating member 123. The heat dissipating member 123 is a member such as grease that can dissipate heat. The heat dissipating member 123 comes into contact with the heat sink 100 and the substrate 70. The exposed surface 122 is exposed without coming into contact with the substrate 70, electronic component 80, and heat dissipating member. In other words, the exposed surface 122 is placed through a gap with the substrate 70 or electronic component 80. That is, the contact surface 121 comes into direct or indirect contact with the substrate 70 or electronic component 80, and the exposed surface 122 has no member that comes into direct or indirect contact with them.

As shown in FIG. 17, the exposed surface 122 is located more to the outer edge than the cavities H (heat sink through-holes 110 in FIG. 17). In this example embodiment, since a plurality of heat sink through-holes 110 are provided along the circumference, the exposed surface 122 is located radially outward from the heat sink through-holes 110. The boundary between the contact surface 121 and the expose surface 122 lies on the circumference. In FIG. 17, the boundary between the contact surface 121 and the exposed surface 122 lies on a circular arc that subtends the central angle α, that is formed by connecting the heat sink through-hole 110U at one end, the heat sink through-hole 110W at the other end, and the central axis A.

Since gaps are formed between the substrate 70 and electronic component 80, and the heat sink 100 by the exposed surface 122, the connections between the substrate 70 or electronic component 80, and conductive members are may be visually detected. Moreover, when a connection from the top surface of the substrate 70 is seen, it is desirable to check from the bottom surface of the substrate 70, because it is not clear whether the connection extends to the inside of the substrate through-holes 71 and the bottom surface of the substrate 70 via a connecting member.

In the heat sink 100 shown in FIG. 1, the exposed surface 122 is located axially below the contact surface 121. FIG. 24 schematically shows the relationship between the vicinity of the boundary between the exposed surface 122 and the contact surface 121, and the substrate 70. As shown in (A) of FIG. 24, the substrate 70 may be in the shape of a plate that extends flat, and the exposed surface 122 may be located below the contact surface 121. Further, as shown in (B) of FIG. 24, the substrate 70 may have a stepped structure, and the exposed surface 122 and the contact surface 121 may lie on the same plane.

The contact surface 121 may have a first contact surface that is in direct contact with the substrate 70 or electronic component 80, and a second contact surface that is in contact with the substrate 70 or electronic component 80 via the heat dissipating member 123.

To check the shape of the lower ends (back fillets) of connecting members that connect the electronic component 80 or substrate 70 and conductive members, it is desirable that the gap between the substrate 70 or electronic component 80 and the exposed surface 122 is wider than the gap between the substrate 70 or electronic component 80 and the second contact surface. Further, in order to prevent the connecting members from wrapping around to the exposed surface 122 and therefore becoming hardly visible because of the narrowing of the gap due to the grease applied to the second contact surface, it is desirable to widen the gap between the substrate 70 or electronic component 80 and the exposed surface 122. Further, if the coil support member 60 is displaced upward, the lower ends of the connecting members become hardly visible, and therefore it is desirable to leave a sufficient gap.

As for the length of such a gap, for example, as shown in FIG. 16, the length L1 between the exposed surface 122 of the heat sink 100 and the bottom surface of the substrate 70 (or electronic component) is larger than the length L2 from the substrate through-hole 71 to an outer end of the land 74.

Also, it is preferable that the angle θ between a virtual line T, which connects the outer end of the land 74 and the intersection of the coil wires C and exposed surface 122, and the exposed surface 122 is 45 degrees or more.

As shown in FIG. 1, if the distal end of a member (coil support member 60 in this example embodiment) supporting conductive members is at the same axial height as the exposed surface or located below it, this makes the lower ends of the connecting members more readily visible. Meanwhile, if the distal end of a member supporting conductive members is at the same axial height as the exposed surface 122 or located above it, this makes it more efficient to prevent the connecting members for connecting the substrate 70 or electronic component 80 and the conductive members from being conducted through the heat sink 100.

As shown in FIG. 1, the heat sink 100 comprises an inner region 130 and an outer region 140 located radially outward from the inner region 130, an outer wall portion 150 formed radially outward from the outer region 140.

The inner region 130 and the electronic component 80 at least partially overlap in an axial direction. The axial thickness of the inner region 130 is larger than the axial thickness of the outer region 140.

In this example embodiment, since the heat sink through-holes 110U, 110V, and 110W are located in an area radially outward from the substrate 70, electronic components are densely arranged in an area radially inward from the substrate 70. Therefore, heat from the electronic components may be extracted to the heat sink 100 by increasing the axial thickness of the inner region 130 of the heat sink 100. Further, space for the components may be secured by decreasing the thickness of the outer region 140. As such, heat dissipation of the electronic components can be done more efficiently, and, at the same time, the axial dimensions can be reduced.

As shown in FIG. 18, the inner region 130 has an inner wall portion 131 and ribs 132. The inner wall portion 131 and the ribs 132 are formed on the heat sink bottom surface 102. The inner wall portion 131 extends axially downward from the radial inner edge. The ribs 132 extend radially outward from the inner wall portion 131. A plurality of ribs 132 are provided, and the ribs 132 are arranged at equal intervals on the circumference. The plurality of ribs 132 radiate out in a radial direction from the central axis A. Because the inner wall portion 131 and the ribs 132 can increase the rigidity of the inner region 130 of the heat sink 100, the durability against the stress for supporting the shaft 41 may be improved if the heat sink 100 holds the bearing 43. Further, by extending the ribs 132 radially, the heat capacity of the heat sink 100 can be increased, and at the same time heat can be easily transferred radially outward.

The outer region 140 has heat sink through-holes 110U, 110V, and 110W into which the above-described coil wires C are inserted. The bottom surface of the outer region 140 is located axially above the bottom surface of the inner region 130.

As shown in FIG. 1, the bus bar holding member 54 is located axially below the outer region 140, and at the same time overlaps the inner region 130 in a radial direction. In other words, an axially upward recess is formed in the bottom surface of the heat sink 10, radially outward from the heat sink 10, and the bus bar B is received in the recess.

In this example embodiment, a number of heating elements (elements such as FET which generate a large amount of heat) are placed at the center (radially inward from) of the substrate 70. As such, the heat dissipation effect can be improved by increasing the thickness of the inner region 130 located at the center of the heat sink 100 facing the substrate 70.

On the other hand, the coil wires C pulled out from the coils 53 of the stator 50 are connected to the outer side (radial outer side) of the substrate 70, and no heating elements are arranged on it. By decreasing the thickness of the outer region 140 and placing the bus bar holding member 54, the axial height may be reduced. Further, the heat sink 100 may absorb radiant heat from the bus bar during operation since the top and side of the bus bar is covered by the heat sink 100.

The outer wall portion 150 surrounds the radial outer side of the bus bar holding member 54. The axial thickness of the outer wall portion 150 is larger than the axial thickness of the inner region 130. At least part of the outer wall portion 150 is exposed externally. Since the outer wall portion 150 includes the part of the heat sink 100 that has the largest axial thickness, the heat dissipation effect may be enhanced.

As shown in FIG. 17, second positioning recesses 176 are formed on the heat sink top surface 101 of the heat sink body 103, so that the heat sink 100 is positioned relative to the substrate 70. A plurality of second positioning recesses 176 are formed, which are circular recesses. Positioning is done by inserting positioning members such as positioning pins into the second positioning recesses 176 of the heat sink 100 and the positioning holes 76 (see FIG. 15) of the substrate 70.

Fixing holes 177 are formed in the heat sink body 103 in order to fix the heat sink 100 relative to the substrate 70. These fixing holes 177 are substrate contact portions that axially come into contact with the substrate 70. A plurality of fixing holes 177 are formed, which are circular holes. The substrate 70 and the heat sink 100 are fixed by inserting fixing members such as fixing pins or screws into the fixing holes 177 of the heat sink 100 and the fixing holes 77 (see FIG. 15) of the substrate.

As noted above, the heat sink 100 and the substrate 70 are positioned using positioning members and fixed in place by fixing members. After the substrate 70 and the heat sink 100 are fixed in place, the positioning members are removed.

Since the heat sink 100 are the substrate 70 are in contact with each other, the fixing holes 177 protrude axially upward from the exposed surface 122. That is, in this example embodiment, the fixing holes 177 are located on the first contact surface.

As shown in FIG. 17, the plurality of heat sink through-holes 110 and the fixing holes 177 are spaced at intervals along the circumference. Two of the fixing holes 177 are circumferentially placed at a distance from the heat sink through-holes 110U and 110W on opposite ends of the circumference, among the plurality of heat sink through-holes 110.

As shown in FIG. 18, a first positioning hole 178 and a first positioning recess 179 or first positioning projection (not shown) are formed on the heat sink protrusions 104 to position the heat sink 100 relative to the connector 200. The first positioning recesses are notched recesses.

As shown in FIG. 1, the connector 200 is placed adjacent to the housing 10, and electrically connects the substrate 70 and the exterior of the motor 1. The connector 200 in this example embodiment is placed radially outward from the housing 10, extends axially downward (facing downward), and contains connector pins 81 which are conductive members that extend axially downward from the substrate 70.

The top surface of the connector 200 is located below the heat sink top surface 101 of the heat sink 100, and the connector 200 and the substrate 70 overlap each other when viewed from the axial upper side.

As shown in FIGS. 25 and 26, the connector 200 has a connector shell 210 that extends axially, a connector flange 220 that extends radially outward from the outer surface of the connector shell 210, and a connector protrusion 230 that extends axially upward from the top surface of the connector shell 210.

As shown in FIG. 27, in a case where a cavity H is formed by the heat sink body 103 and the two heat sink protrusions 104, at least part of the connector shell 210 is located in the cavity H.

The connector shell 210 has shell projections 211 or shell recesses (not shown) that are formed on the outer surface and extend axially. The shell projections 211 extend axially from the connector flange 220 to the connector protrusion 230.

As shown in FIGS. 6, 26, etc., the connector shell 210 further has a connector projection 215 that is formed in a radial outer edge area and extends axially. The connector projection 215 is an outer rim portion comprising a connector outer rim 216 on the radial outer side. The term "connector outer rim 216" refers to an outer edge (an edge of the connector 200).

The connector shell 210 further has a pocket recess 217 formed by the radial inner surface of the connector projection 215, radially inward from the connector projection 215. The pocket recess 217 stores dust coming from the outside.

The connector flange 220 is formed at an axial center part of the connector shell 210. The center part is within a predetermined range from the center (for example, ⅓ or less of the axial height relative to the center). Thus, it is possible to increase durability even if the connector 200 is subjected to external force.

As shown in FIGS. 25 and 26, fitting portions 221 for positioning the heat sink 100 are formed on the top surface of the connector flange 220. The fitting portions 221 are fitted into the first positioning hole 178 and the first positioning recess 179 or first positioning projection (not shown). The fitting portions 221 in this example embodiment are protruding portions that extend upward.

The connector protrusion 230 extends upward from the top surface of the connector shell 210. The connector protrusion 230 may be formed integrally with the connector shell 210 or may be a separate member.

As shown in FIG. 6, the connector projection 215 and the cover recess 33 are fitted together through a gap. The connector 200 is approximately rectangular when viewed on a plane. The connector projection 215 and the cover recess 33 extend along the long side of the connector 200.

Further, as shown in FIG. 1, the connector protrusion 230 and the cover stepped portion 35 are fitted together through a gap. A corner portion on the radial outer side of the connector protrusion 230 and the cover stepped portion 35 are fitted together, facing each other.

Although the fitting of the cover 30 and the outer edge region R of the connector 200 in this example embodiment have been described with respect to the structure shown in FIG. 6, they may be fitted as shown in FIGS. 7 to 9.

In the structure shown in FIG. 7, the connector projection 215 is not formed by the connector outer rim 216, but extends axially upward from where it is at a distance from the connector outer rim 216 in a radial direction. The connector projection 215 and the cover recess 33 are fitted together through a gap, in the outer edge region R that does not encompass the cover outer rim 31 and the connector outer rim 216.

In the structure shown in FIG. 8, the connector 200 further has a stepped portion 218 that extends radially inward from the upper edge of the radial inner surface of the pocket recess 217. A recess 219 comprising the pocket recess 217 and the stepped portion 218, and the cover projection 34 are fitted together through a gap, along with the fitting together of the connector projection 215 and the cover recess 33 through a gap.

In the structure shown in FIG. 9, the connector 200 has a pocket recess 217 that is formed by the radial outer surface of the connector projection 215, radially outward from the connector projection 215. Part of the cover recess 33 faces the pocket recess 217, and the rest of the cover recess 33 is fitted to the connector projection 215 through a gap. The connector projection 215 and the cover recess 33 are fitted together through a gap, in the outer edge region R that does not encompass the cover outer rim 31 and the connector outer rim 216.

In this way, the motor 1 in this example embodiment has a labyrinth structure in which the cover 30 and the connector 200 are fitted together through a gap by their projected and recessed shapes. As such, dust proofing can be achieved, and the motor can be easily assembled.

As shown in FIG. 27, the connector 200 comes into contact with the bottom surfaces of the heat sink protrusions 104. Specifically, the heat sink protrusions 104 are arranged on the connector flange 220 such that the flange top surface 222 of the connector flange 220 and the heat sink bottom surfaces 102 of the heat sink protrusions 104 come into contact with each other. As shown in FIG. 17, if a plurality of heat sink protrusions 104 are formed at a distance from each other, the connector flange 220 comes into contact with the bottom surfaces of the plurality of heat sink protrusions 104.

The shell projections 211 and the heat sink recesses 105 are fitted together through a gap. Also, shell recesses may be formed in place of the shell projections 211, and heat sink projections may be formed in place of the heat sink recesses, so that the shell recesses and the heat sink projections are fitted together through a gap. In this way, the connector 200 and the heat sink 100 may be fitted together through a gap by their projected and recessed shapes, thereby making assembly easier.

The shell projections or shell recesses and the heat sink recesses or heat sink projections, which are fitted together through a gap, extend axially.

The heat sink 100 and the connector 200 are positioned by fitting the fitting portions 221 of the connector into the first positioning hole 178 (see FIGS. 17 and 18) of the heat sink 100 and the first positioning recess 179 (see FIG. 18) or first positioning projection (not shown). In this example embodiment, the fitting portions 221, which are protrusions provided on the top surface of the connector flange 220, the first positioning hole 178, which is a round hole at a heat sink protrusion 104, and the first positioning recess 179, which is a notched recess, are fitted together.

The heat sink 100 and connector 220 may be positioned, preferably by fitting them together, and the configuration is not limited.

As described above, while this example embodiment has been described with respect to an example in which the cover 30 and the connector 200 are fixed to the heat sink 100, the heat sink and connector in the motor of the present disclosure may be fixed to the cover. In the latter case, a structure in which the heat sink and the connector are fitted together through a gap is adopted, thereby making assembly easier.

While this example embodiment has been described with respect to a configuration in which the heat sink 100 also serves as a holder for holding the bearing 43, the heat sink of the present disclosure may be a separate object from the bearing holder.

Further, while this example embodiment has been described with respect to a configuration in which the heat sink 100 also serves as a holder for holding the coil wires C inserted into the heat sink through-holes 110 and the coil support member 60, the holder in the present disclosure that holds the coil wires and the coil support member may be a separate object from the heat sink.

Example Embodiment 2

Referring to FIG. 28, a description will be given of an example embodiment of a device comprising the motor 1 of Example Embodiment 1. In Example Embodiment 2, a description will be given of an example in which the motor 1 is mounted on the electric power steering device.

The electric power steering device 2 is mounted on a steering mechanism for wheels of a vehicle. The electric power steering device 2 in this example embodiment is a column-assist power steering device which, powered by the motor 1, reduces steering forces on its own. The electric power steering device 2 comprises the motor 1, a steering shaft 914, and an axle 913.

The steering shaft 914 transfers input from steering 911 to the axle 913 having wheels 912. The power of the motor 1 is transferred to the axle 913 through a ball screw. The motor 1 adopted in the column-assist electric power steering device 2 is installed inside an engine room (not shown). In the column-assist electric power steering device, a water-proof structure can be installed in the engine room, so there is no need to install a water-proof structure in the motor. On the one hand, dust may enter the engine room, and the motor 1 may keep dust from entering the motor main body because of its dust-proof structure.

The electric power steering device 2 of Example Embodiment 2 comprises the motor 1 of Example Embodiment 1. Therefore, the electric power steering device 2 can achieve the same effects as Example Embodiment 1.

Although the electric power steering device 2 has been cited as an example of using the motor 1 of Example Embodiment 1, the use of the motor 1 is not limited but may be widely used for pumps, compressors, etc.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
a rotor including a shaft that extends axially;
a stator that surrounds a radially outer side of the rotor;
a heat sink that is axially above the stator; and
a substrate that is axially above the heat sink and includes an electronic component mounted thereon; wherein
the stator includes:
    coils defined by windings of coil wires; and
    a bus bar holder that holds a bus bar that connects the coil wires;
the heat sink includes:
    an inner region including a first inner region portion which includes a wall portion that extends axially downward at a radially inner edge of the heat sink and a second inner region portion that is arranged radially outward from the first inner region portion;
    an outer region located radially outward from the inner region;
    a recess defined in the outer region; and
    an outer wall portion provided radially outward from the outer region and surrounding a radially outer side of the bus bar holding member; and
an axial thickness of the inner region is larger than an axial thickness of the outer region, a bottom surface of the outer region is located axially above a bottom surface of the inner region, the inner region and the electronic component at least partially overlap in an axial direction, and the bus bar holder is located axially below the recess of the outer region and overlaps the inner region in a radial direction.

2. The motor of claim 1, further comprising:
a bearing that rotatably supports the shaft; wherein
the heat sink holds the bearing; and
the bearing and the bus bar holder overlap in a radial direction.

3. The motor of claim 1, wherein an axial thickness of the outer wall portion is larger than the axial thickness of portions of the inner region except for the wall portion.

4. The motor of claim 1, wherein at least a portion of the outer wall portion is exposed externally.

5. The motor of claim 1, wherein the
inner region includes
ribs that are provided on a bottom surface and extend radially outward from the wall portion.

6. The motor of claim 1, wherein
the stator includes:
    a stator core including a plurality of core backs arranged around a circumference; and
    an insulator that covers at least a portion of the stator core; and
the bus bar holder is fixed to a radial outer side of the insulator or to an axial upper side of the core backs.

7. The motor of claim 1, wherein the outer region includes through-holes into which the coil wires are inserted.

8. An electric power steering device comprising the motor of claim 1.

* * * * *